United States Patent
Iwagawa et al.

(10) Patent No.: US 6,997,289 B2
(45) Date of Patent: Feb. 14, 2006

(54) ELECTRICALLY-OPERATED PARKING BRAKE DEVICE

(75) Inventors: Yoshihiro Iwagawa, Saitama (JP); Jun Miyakawa, Saitama (JP); Makoto Taniguchi, Saitama (JP); Yutaka Kichima, Saitama (JP); Katsuyuki Takei, Saitama (JP); Makoto Bessho, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/435,615

(22) Filed: May 9, 2003

(65) Prior Publication Data

US 2004/0016612 A1    Jan. 29, 2004

(30) Foreign Application Priority Data

May 13, 2002  (JP)  .............................. 2002-136779

(51) Int. Cl.
    *B60T 13/66*    (2006.01)
(52) U.S. Cl. ..................................... 188/2 D; 303/20
(58) Field of Classification Search ................. 303/20, 303/16, 155; 188/2 D, 156, 171, 265
    See application file for complete search history.

(56) References Cited

U.S. PATENT DOCUMENTS

| 2,550,403 | A | * | 4/1951 | Carmichael | ............... | 192/219.6 |
|---|---|---|---|---|---|---|
| 2,725,131 | A | * | 11/1955 | Martin | ..................... | 192/219.6 |
| 3,119,477 | A | * | 1/1964 | Ryder | ........................... | 477/194 |
| 3,593,815 | A | * | 7/1971 | Inoue | ........................... | 180/271 |
| 4,281,736 | A | * | 8/1981 | Lizzio | ........................... | 180/271 |
| 4,553,650 | A | * | 11/1985 | Warwick et al. | ......... | 192/219.7 |
| 6,631,796 | B1 | * | 10/2003 | Yanaka et al. | ........... | 192/219.4 |
| 6,662,909 | B1 | * | 12/2003 | Taniguchi | .................... | 188/162 |

FOREIGN PATENT DOCUMENTS

| FR | 2 813 837 A | 3/2002 |
|---|---|---|
| JP | 5-9973 | 3/1993 |
| JP | 07-144623 | 6/1995 |
| JP | 07 144623 A | 6/1995 |

* cited by examiner

*Primary Examiner*—Melanie Torres
(74) *Attorney, Agent, or Firm*—Carrier, Blackman & Associates, P.C.; Joseph P. Carrier; William D. Blackman

(57) ABSTRACT

When a shift position is shifted from an R range to a D range and when the shift position is shifted from the D range to the R range, an electrically-operated parking brake device is automatically cancelled. In this manner, the electrically-operated parking brake device is cancelled without waiting for the depression of an accelerator pedal with a driver's intention to start a vehicle taken into consideration. Therefore, it is possible not only to alleviate a burden on the driver in canceling the electrically-operated parking brake device, but also to prevent an abrupt starting of the vehicle due to the cancellation of the electrically-operated parking brake device while the accelerator pedal is being depressed to transmit a large driving force to driven wheels.

11 Claims, 22 Drawing Sheets

ELECTRICALLY-OPERATED PARKING BRAKE DEVICE

BACKGROUND OF THE INVENTION

1. Field of the Invention

The present invention relates to an electrically-operated parking brake device adapted to actuate wheel brakes by an electrically driving mechanism.

2. Description of the Related Art

There is an electrically-operated parking brake device for automatically actuating and canceling parking brakes, which is known from Japanese Patent Application Laid-open No. 7-144623 and Japanese Utility Model Publication No. 5-9973, and which is designed so that when the shift position is shifted from a non-traveling range (an N range or a P range) to the traveling range (a D range or an R range), it is decided that a driver has an intention to start a vehicle, and the parking brake device is canceled automatically, thereby alleviating the driver's burden.

Not only when the shift position is shifted from the non-traveling range to the traveling range, but also when the shift position is shifted from one of the traveling ranges to the other traveling range, namely, from the D range to the R range or from the R range to the D range, the driver is considered to have an intention to start the vehicle. In the above-described electrically-operated parking brake device, however, the parking brake device cannot be canceled when the shift position is shifted from the one traveling range to the other traveling range. Therefore, if the driver attempts to cancel the parking brake device by a manual operation, the driver's operating burden is increased. In addition, when the parking brake device is canceled in a state in which an accelerator pedal has been depressed, there is a possibility that the vehicle is started abruptly.

SUMMARY OF THE INVENTION

Accordingly, it is an object of the present invention to achieve the alleviation of the driver's burden and the prevention of the abrupt starting of the vehicle by appropriately carrying out the automatic cancellation of the electrically-operated parking brake device at the start of the vehicle.

To achieve the above object, according to the present invention, there is provided an electrically-operated parking brake device adapted to actuate wheel brakes by an electrically driving mechanism, wherein when one of a forward traveling range and a backward traveling range is selected and the wheel brakes are in operation, if the one traveling range is shifted to the other traveling range, the wheel brakes are released in response to said shifting.

With the above arrangement, when the shift position is changed from one of the forward and backward traveling ranges to the other traveling range in a state in which the wheel brakes are in operation, the wheel brakes are canceled without waiting for the depression of an accelerator pedal with a driver's intention to start the vehicle taken into consideration. Therefore, it is possible not only to alleviate the driver's operating burden in canceling the wheel brakes but also to prevent the abrupt starting of the vehicle due to the cancellation of the wheel brakes in a state in which the accelerator pedal is being depressed to transmit a large driving force to driven wheels.

An electric motor 30 in an embodiment of the present invention corresponds to the electrically driving mechanism.

The above and other objects, features and advantages of the invention will become apparent from the following description of the preferred embodiment taken in conjunction with the accompanying drawings.

DESCRIPTION OF THE PREFERRED EMBODIMENT

The present invention will now be described by way of a preferred embodiment with reference to the accompanying drawings.

Figure 1:
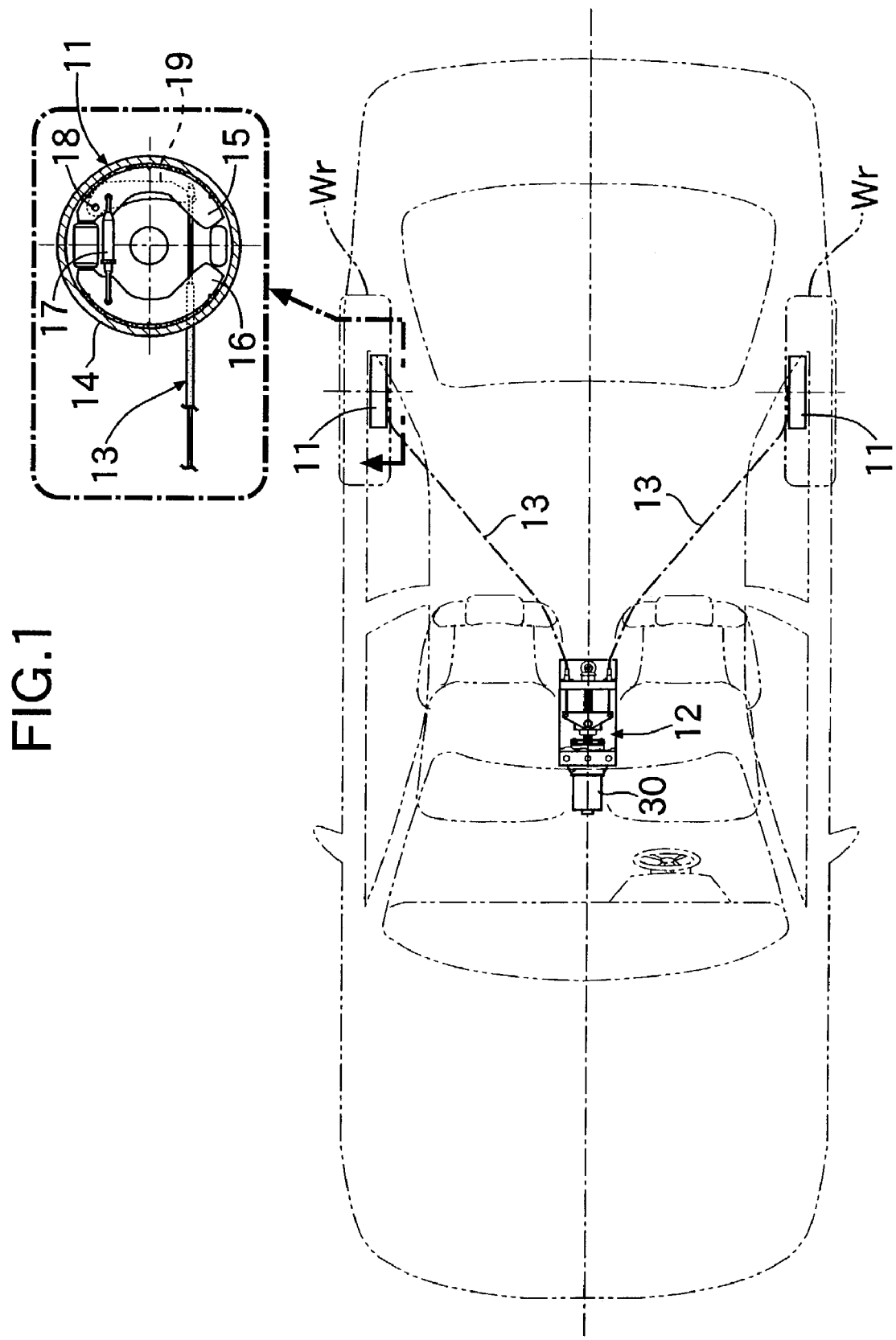
FIG. 1 is a plan view of the entire arrangement of a vehicle including an electrically-operated parking brake device.

Referring first to FIG. 1, drum-type wheel brakes 11, 11 are mounted on left and right rear wheels Wr, Wr of a vehicle, and an electrically-operated parking brake device 12 disposed sideways of a driver's seat is connected to the wheel brakes 11, 11 through left and right Bowden wires 13, 13. Each of the wheel brakes 11 includes a brake drum 14, a pair of brake shoes 15 and 16 capable of being brought into contact with an inner peripheral surface of the brake drum 14, a connecting rod 17 for connecting the brake shoes 15 and 16 to each other, and a lever 19 rotatably supported at one end on one of the brake shoes 15 through a pin 18. The Bowden wire 13 is connected to the other end of the lever 19.

Therefore, when the Bowden wires 13 are pulled by an electric motor 30 mounted on the electrically-operated parking brake device 12, the lever 19 is rotated in a clockwise direction shown in FIG. 1 about the pin 18 to apply a compression load to the connecting rod 17. The load allows the other brake shoe 16 to be pushed leftwards as shown in FIG. 1 and allows one brake shoe 15 to be pushed rightwards as shown in FIG. 1 through the connecting rod 17 and the pin 18 against the brake drum 14, whereby the wheel brake 11 generates a braking force. On the other hand, when the Bowden wires 13 are loosened by the electric motor 30, the brake shoes 15 and 16 are moved away from the brake drum 14 by a resilient force of a return spring (not shown), whereby the braking force of the wheel brake is released.

In addition, since the electrically-operated parking brake device 12 is disposed sideways of the driver's seat, the manual actuating operation or releasing operation by an occupant can be easily conducted. If the electric motor 30 or its control system has failed, the braking force can be generated in the wheel brake 11 or canceled by the manual operation conducted by the occupant. Further, the steep bending of the Bowden wires 13, 13 extending from the electrically-operated parking brake device 12 to the wheel brakes 11, 11 can be prevented to decrease the transmission loss of a brake-operating force.

Figure 2:
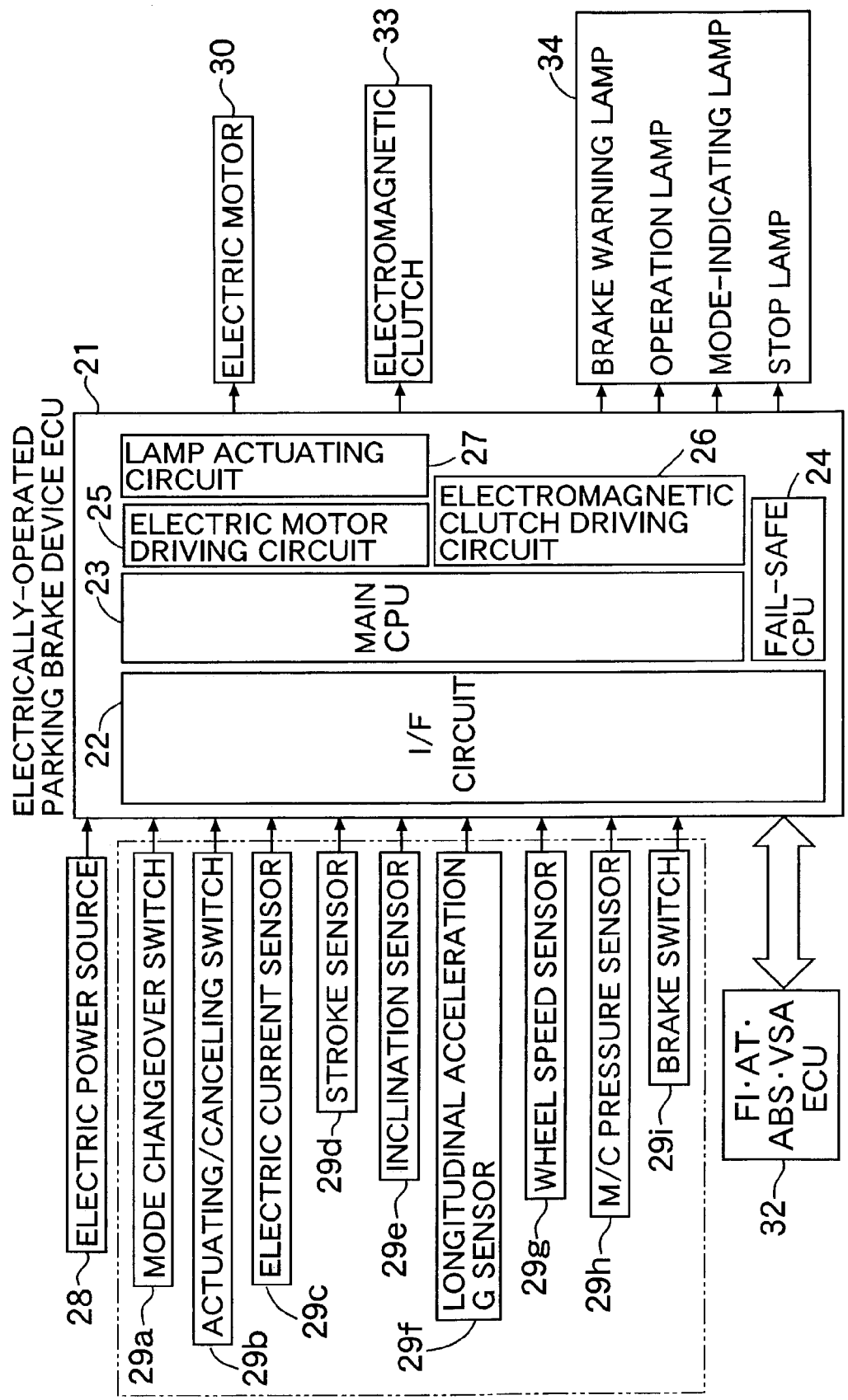
FIG. 2 is a block diagram of a control system for the electrically-operated parking brake device.
Figure 3:
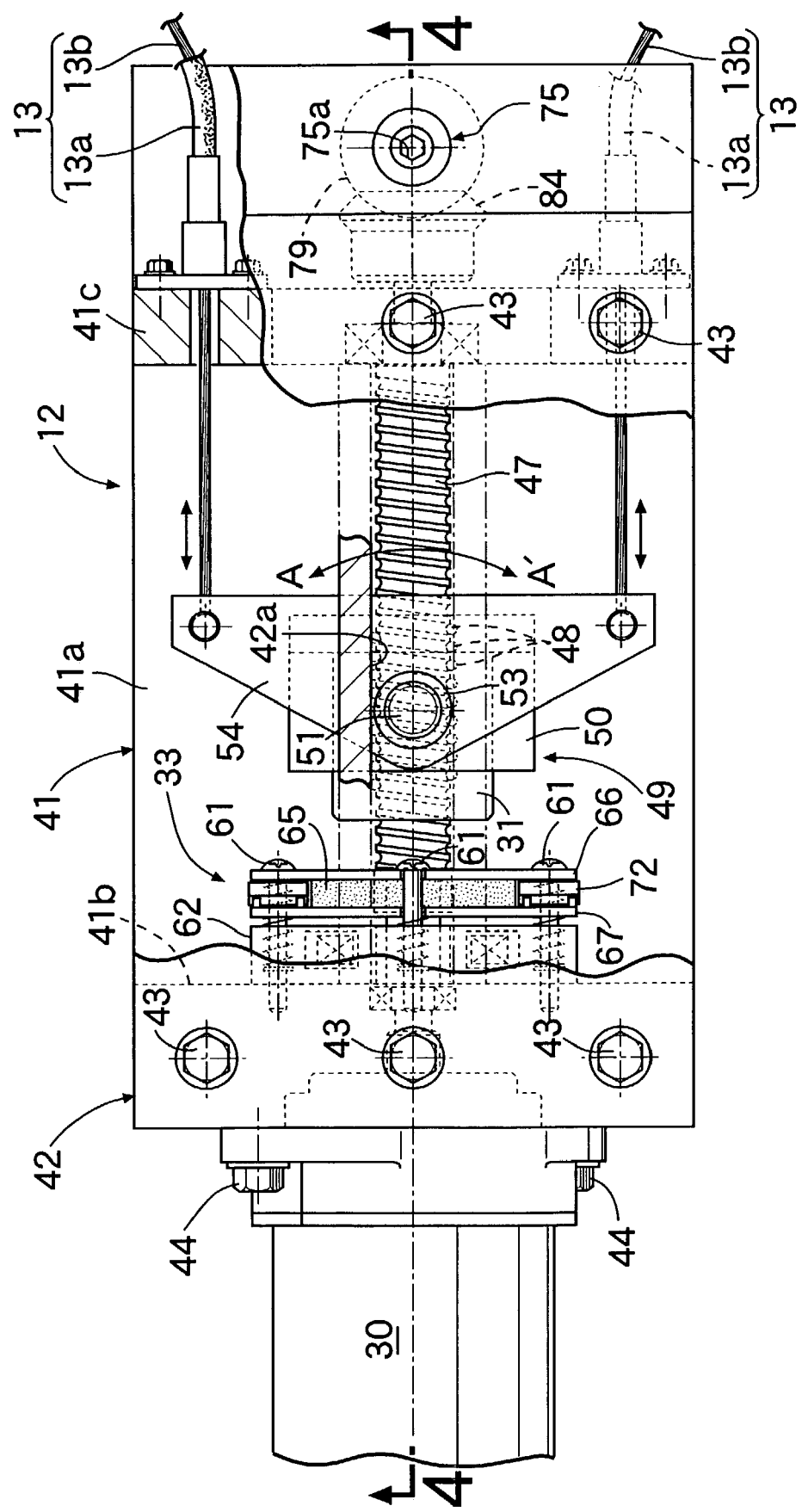
FIG. 3 is a partially broken-away plan view of the electrically-operated parking brake device.

As shown in FIG. 2, an electrically-operated parking brake control unit ECU21 for controlling the operation of the electrically-operated parking brake device 12 includes an interface circuit 22, a main CPU 23, a fail-safe CPU24, an electric motor-driving circuit 25, an electromagnetic clutch-driving circuit 26 and a lamp-actuating circuit 27. The electrically-operated parking brake control unit ECU21 obtains power from a power source system. Connected to the interface circuit 22 are a mode-changeover switch 29a for changing over an automatic mode and a manual mode from one to another, an actuating/canceling switch 29b for actuating or canceling the electrically-operated brake device 12 by the switching operation by the occupant irrespective of the state of the mode-changeover switch 29a, a current sensor 29c for detecting an electric current flowing through the electric motor 30, a stroke sensor 29d for detecting the position of a nut member 31 which will be described hereinafter, an inclination sensor 29e for detecting an longitudinal inclination of a road surface on which the vehicle is, a longitudinal acceleration sensor 29f for detecting a longitudinal acceleration of the vehicle, a wheel speed sensor 29g for detecting forward and backward wheel speeds, a master cylinder pressure sensor 29h for detecting a master cylinder pressure in a hydraulic brake device, and a brake switch 29i for detecting the operation of a brake pedal.

Various signals such as an accelerator opening degree signal, a shift position signal, an idling stop signal and a brake control signal are input to the interface circuit 22 of the electrically-operated parking brake control unit ECU21 from the outside ECU such as a fuel injection device, an automatic transmission, an antilock brake device and a VSA system (a vehicle stability assisting system). The electrical motor-driving circuit 25 is connected to the electric motor 30, and the electromagnetic clutch-driving circuit 26 is connected to an electromagnetic clutch 33 which will be described hereinafter. The lamp-driving circuit 27 is connected to lamps 34 such as a brake warning lamp, an actuating lamp, a mode-indicating lamp and stopping lamp.

The structure of the electrically-operated parking brake device 12 will be described below with reference to FIGS. 3 to 7.

A housing 41 constituting a body of the electrically-operated parking brake device 12 includes a bottom wall 41a disposed horizontally, a front rising wall 41b rising from a front end of the bottom wall 41a, and a rear rising wall 41c rising from the vicinity of a rear end of the bottom wall 41a. Front and rear ends of an upper cover 42 are fixed to an upper surface of the front rising wall 41b and an upper surface of the rear rising wall 41c respectively by a plurality of bolts 43. The electric motor 30 having an output shaft 30a turned rearwards is fixed to a front surface of the front rising wall 41b of the housing 41 by a plurality of bolts 44.

A screw shaft 47 is supported on the front rising wall 41b and the rear rising wall 41c with ball bearings 45 and 46 interposed therebetween, respectively, and the output shaft 30a of the electric motor 30 is connected to a front end of the screw shaft 47. The nut member 31 is meshed with an outer periphery of the screw shaft 47 with a large number of balls 48 interposed therebetween, and a ball screw mechanism 49 is constituted by the screw shaft 47, the balls 48 and the nut member 31. A collar 50 is press-fitted over an outer periphery of the nut member 31, and an upper support shaft 51 and a lower support shaft 52 extending vertically are fixed to upper and lower surfaces of the collar 50. A guide roller 53 rotatably supported at an upper end of the upper support shaft 51 is movably fitted into a guide groove 42a defined longitudinally in a lower surface of the upper cover 42, so that it is prevented from being rotated.

An equalizer 54 elliptic in section is disposed to surround the outer periphery of the nut member 31 and supported by the upper support shaft 51 and the lower support shaft 52 for oscillation in a lateral direction. Each of the Bowden wires 13, 13 is comprised of an outer tube 13a, 13a, and an inner tube 13b, 13b relatively movably accommodated in the outer tube 13a, 13a. The outer tubes 13a, 13a are fixed at their front ends to a rear surface of the rear rising wall 41c, and the inner tubes 13b, 13b are passed through the rear rising wall 41c and fixed at their front ends to left and right opposite ends of the equalizer 54.

The amount of movement of the nut member 31 along the screw shaft 47 is proportional to a number of rotation of the screw shaft 47 and hence, the stroke sensor 29d for detecting the amount of movement of the nut member 31 can be constituted, for example, by a rotary encoder for detecting a rotational angle of the screw shaft 47.

The electromagnetic clutch 33 includes a core 62 fixed to a rear surface of the front rising wall 41b by four bolts 61, a coil 63 accommodated in the core 62, a rotor 65 fixed to a front portion of the screw shaft 47 by a key 64 and located on the rear side of the core 62, a plate 66 longitudinally movably supported on four bolts 61 and disposed between a rear surface of the rotor 65 and heads of the bolts 61, and an armature 67 longitudinally movably supported on the four bolts 61 and disposed between a rear surface of the core 62 and a front surface of the rotor 65. A first coil spring 68 and a second coil spring 69 are supported around each of upper and lower two bolts 61, 61. The first coil spring 68 is disposed between a recess 62a of the core 62 and the armature 67, and biases the armature 67 in a direction to contact with the front surface of the rotor 65. The second coil spring 69 is disposed between the armature 67 and the plate 66, and biases the armature 67 and the plate 66 away from the front and rear surfaces of the rotor 65. Only a first coil 68 is supported around each of outer peripheries of left and right two bolts 61, 61, and the second coil spring 69 is not supported around each of outer peripheries of the left and right bolts 61, 61 in order to avoid the interference with an elongated bore 71a in an arm portion 71 of a canceling member 72 which will be described hereinafter.

Each of the first coil springs 68 has a biasing force set stronger than that of each of the second coil springs 69. Therefore, when coils 63 are in de-excited states, the rotor 65 is sandwiched between the armature 67 and the plate 66 by the biasing forces of the first springs 68, whereby the rotation of the screw shaft 47 is restrained. When the coils 63 are excited, the armature 67 is attracted to the core 62 against the biasing force of the first coil springs 68, and the armature 67 and the plate 66 are moved away from the rotor 65 by the biasing forces of the second coil springs 69, whereby the rotation of the screw shaft 47 is permitted.

The canceling member 72 formed into a U-shape and having a base portion 70 extending laterally and arm portions 71, 71 extending upwards from opposite ends of the base portion 70, is disposed between the plate 66 and the armature 67. The two left and right bolts 61, 61 are passed through elongated bores 71a, 71a defined in the left and right arm portions 71, 71 and extending vertically, whereby the canceling member 72 is guided movably in a vertical direction. Two upper and lower slants 71b and 71c are formed on each of sides of the arm portions 71 of the canceling member 72, which are opposed to the armature 67, and two upper and lower slants 67a and 67b capable of being brought into contact with the slants 71b and 71c are formed on the armature 67. When the canceling member 72 is in a lowered position shown in FIGS. 6 and 7, the slants 71b, 7ab; 71c, 71c of the canceling member 72 are spaced apart from the slants 67a, 67a; 67b, 67b of the armature 67.

A rotary shaft 75 is vertically movably and rotatably supported on a plane bearing 73 mounted at the rear end of the bottom wall 41a of the housing 41 and a plane bearing 74 mounted at a rear end of the rear rising wall 41c of the housing 41. A coil spring 78 is disposed between a spring seat 77 supported at a lower portion of the rotary shaft 75 with a ball bearing 76 interposed therebetween and the bottom wall 41a of the housing 41. The rotary shaft 75 biased upwards by a biasing force of the coil spring 78 is stopped in a position where a driving bevel gear 79 fixed to an upper portion of the rotary shaft 75 is in contact with a lower surface of the plane bearing 74 mounted at the rear end of the rear rising wall 41c of the housing 41. A hexagonal bore 75a for receiving a hexagonal wrench 80 (see FIG. 8) is defined axially in an upper end of the rotary shaft 75.

A lever 82 is supported at its intermediate portion for vertical oscillation on a bracket 41d mounted on a central portion of the bottom wall 41a of the housing 41 through a pin 81 extending laterally. A laterally extending pin 83 is fixed to a bracket 77a mounted on an upper surface of the spring seat 77 and is fitted into a longitudinally extending elongated bore 82a defined in a rear end of the lever 82. A front end of the lever 82 is fitted into a vertically extending elongated bore 70a defined in the base portion 70 of the canceling member 72.

A follower bevel gear 84 is fixed to a rear end of the screw shalt 47 passed rearwards through the rear rising wall 41a. When the rotary shaft 75 is in a position in which it has been raised by the biasing force of the coil spring 78, the driving bevel gear 79 on the rotary shaft 75 and the follower bevel gear 84 on the screw shaft 47 are not meshed with each other, but when the rotary shaft 75 is lowered against the biasing force of the coil spring 78, the driving bevel gear 79 and the follower bevel gear 84 can be meshed with each other.

The operation of the embodiment of the present invention having the above-described arrangement will be described below.

Figure 4:
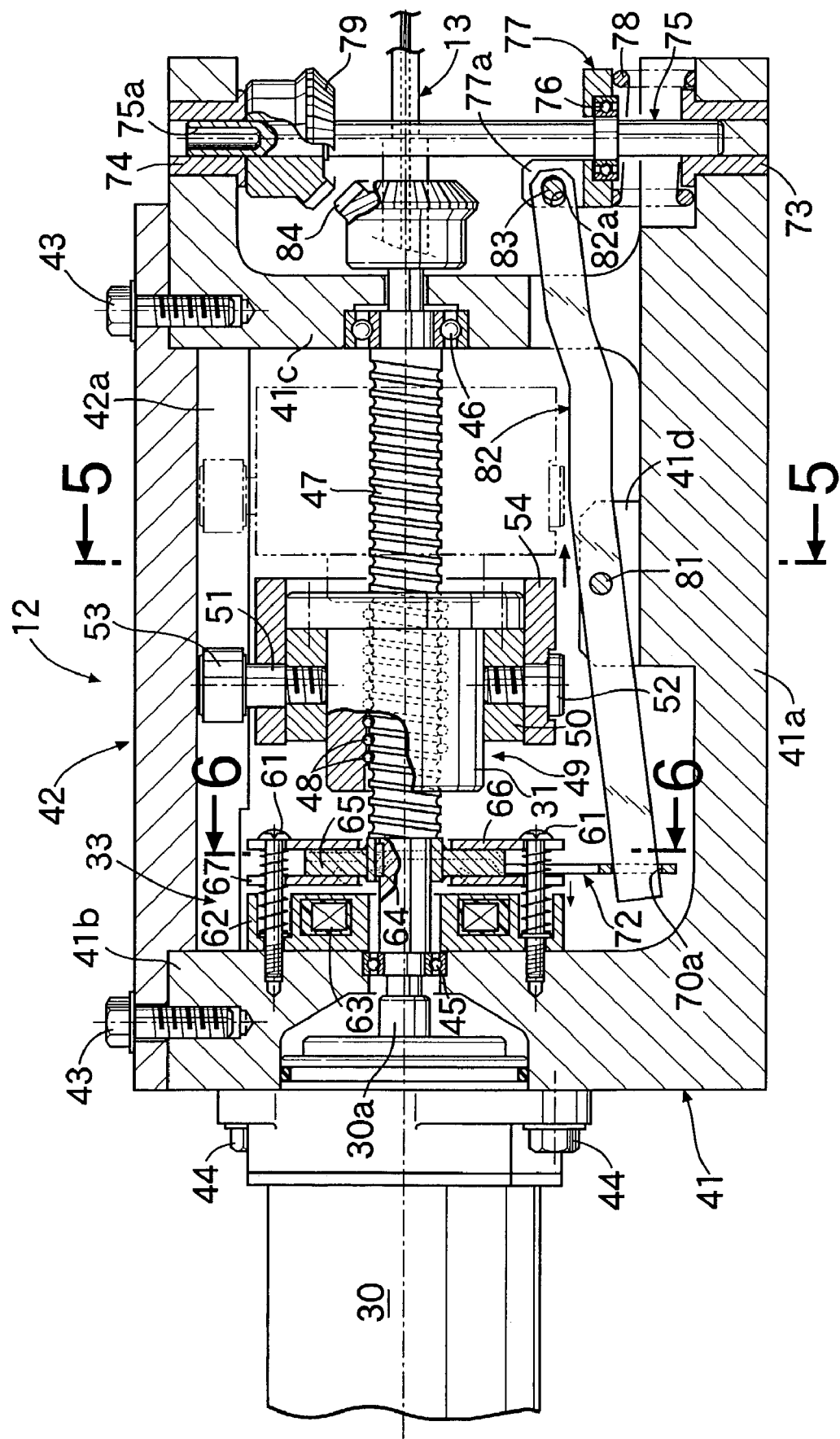
FIG. 4 is a sectional view taken along a line 4—4 in FIG. 3.
Figure 5:
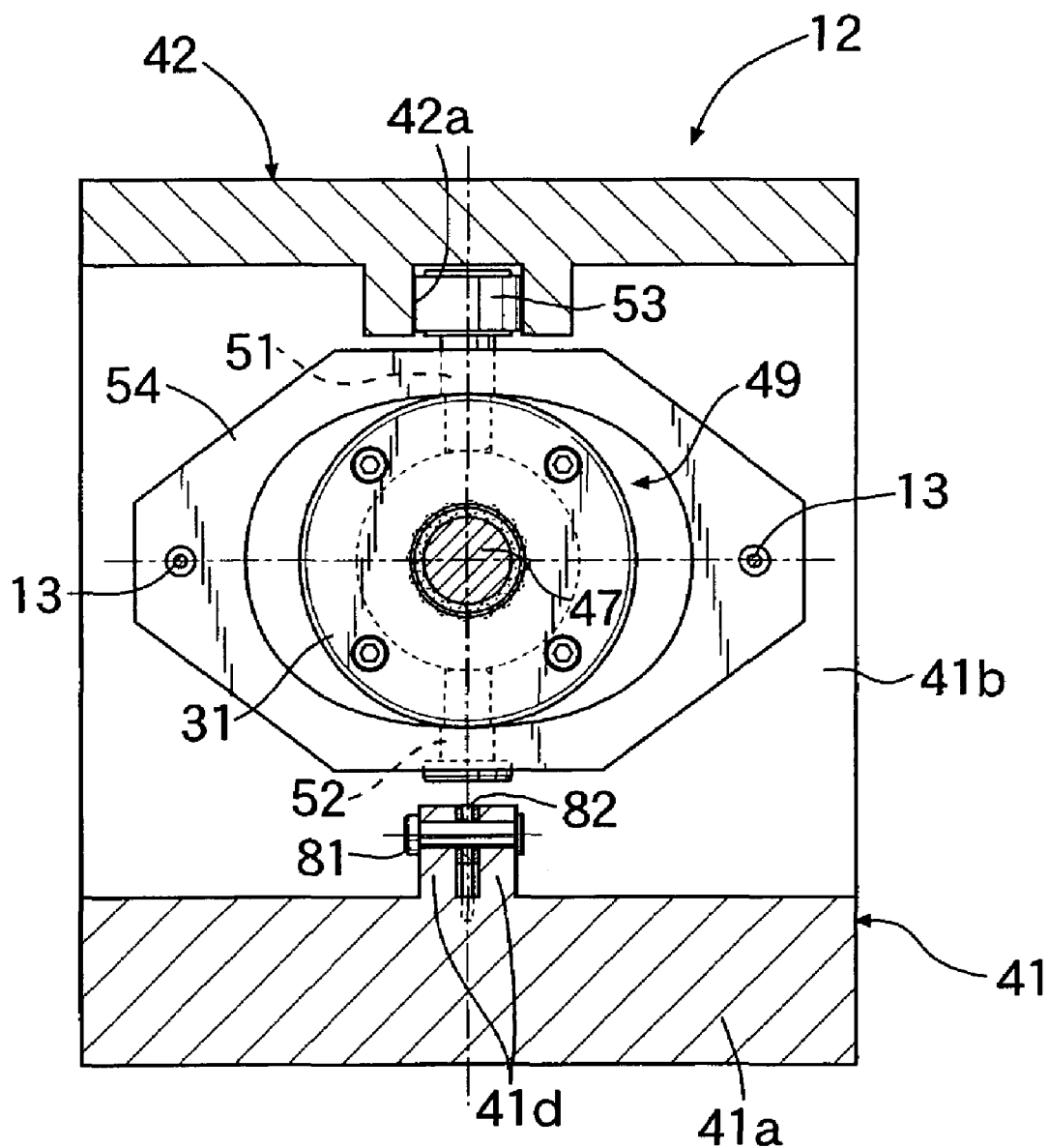
FIG. 5 is a sectional view taken along a line 5—5 in FIG. 4.
Figure 6:
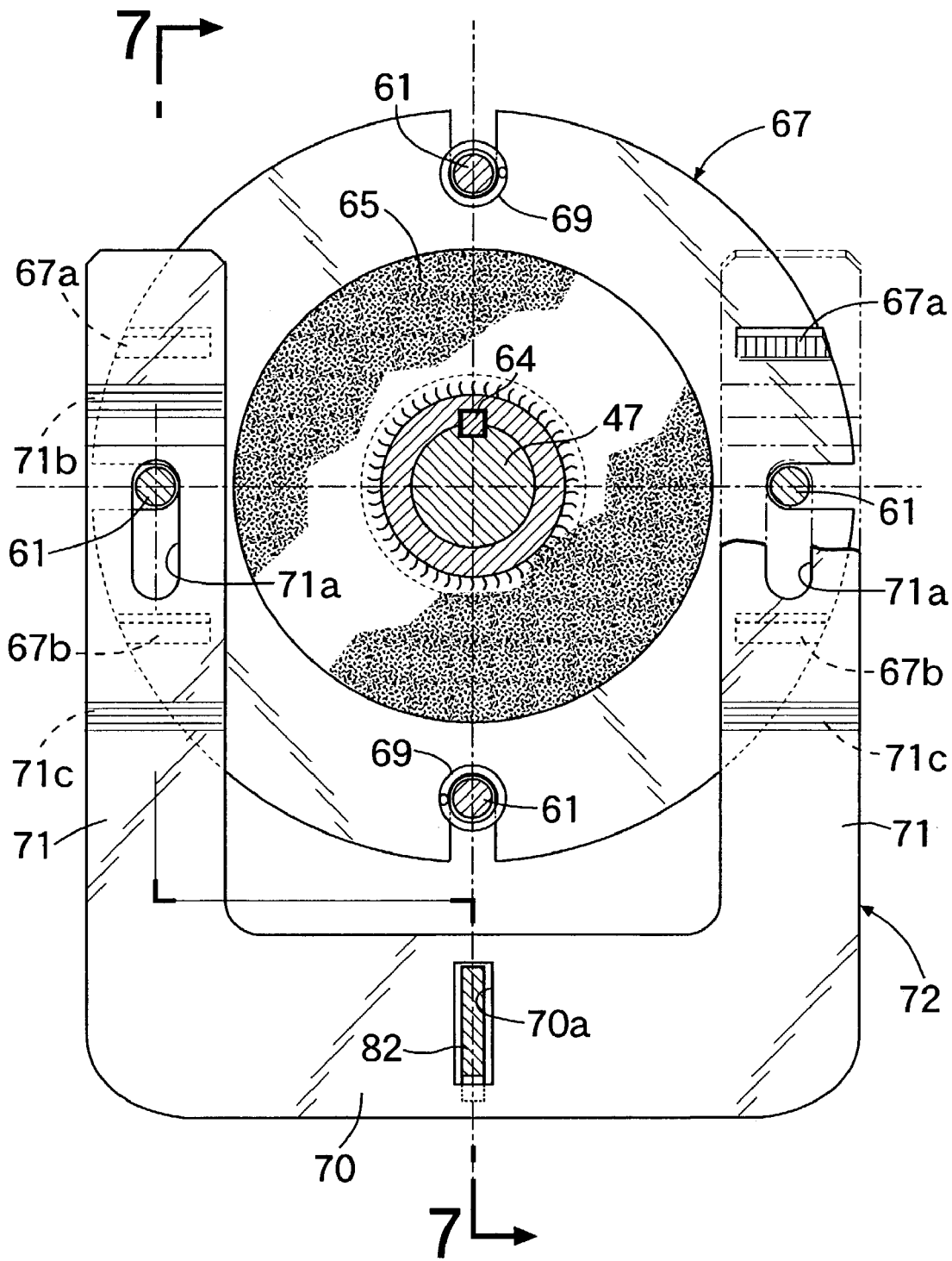
FIG. 6 is a sectional view taken along a line 6—6 in FIG. 4.
Figure 7:
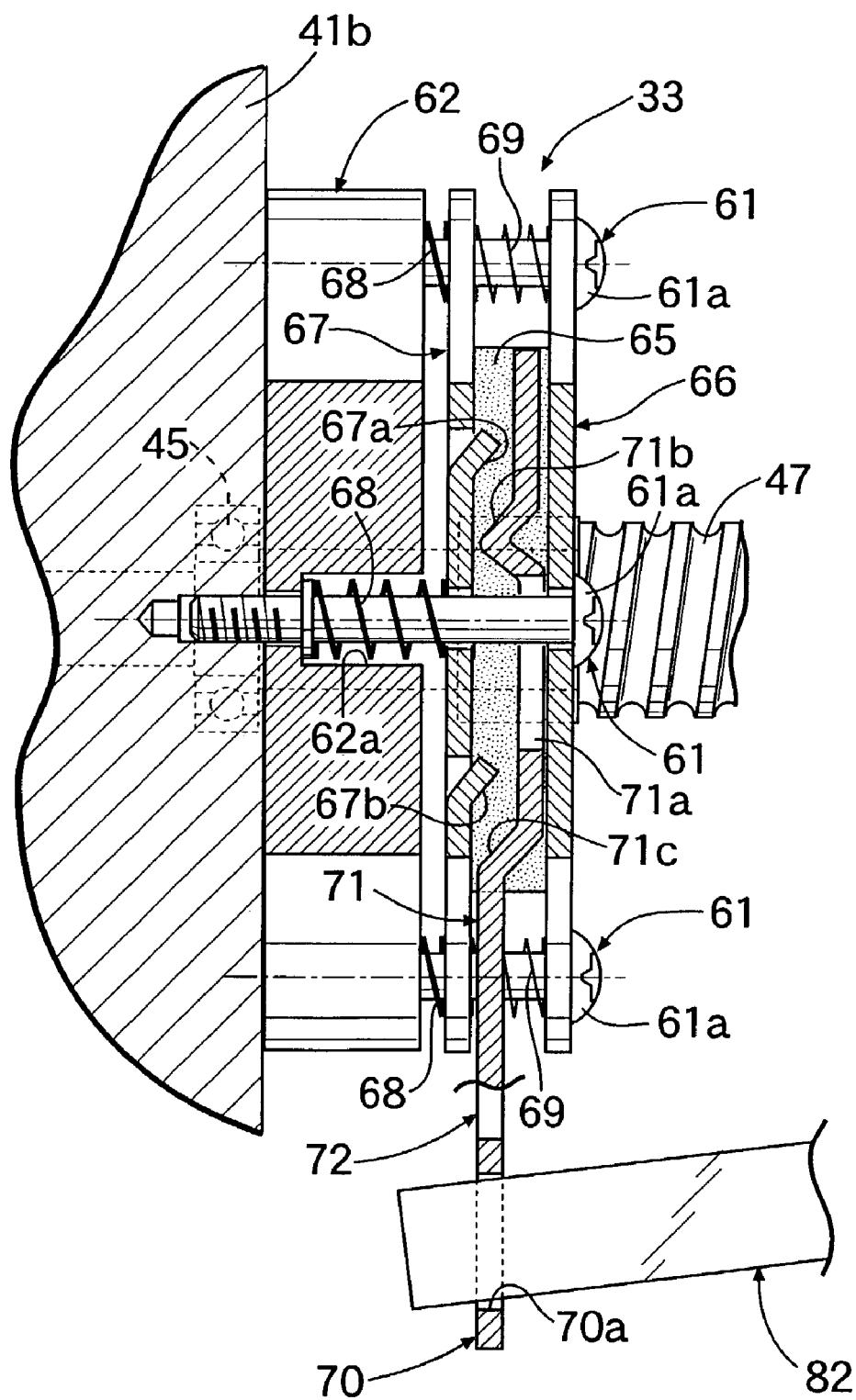
FIG. 7 is a sectional view taken along a line 7—7 in FIG. 6.

When the electrically-operated parking brake device 12 is not in operation, the nut member 31 of the ball screw mechanism 49 is in a rear position shown by a dashed line in FIG. 4, and the equalizer 54 supported on the nut member 31 has been also moved rearwards, whereby the Bowden wires 13, 13 have been loosened. At this time, the coil 63 of the electromagnetic clutch 33 is not excited, and the screw shaft 47 integral with the rotor 65 is restrained by clamping the rotor 65 between the armature 67 and the plate 66 by the biasing force of the first coil springs 68 so that it is not disadvantageously rotated by any external force. In addition, the rotary shaft 75 is retained in a first upper position (see FIG. 4) by the biasing force of the coil spring 78, and hence the meshing between the driving bevel gear 79 and the follower bevel gear 84 is released, and the canceling member 72 is in a lower inoperative position (see FIG. 7).

When a command for operating the electrically-operated parking brake device 12 in this state is output by the electrically-operated parking brake control unit ECU21 or the actuating/canceling switch 29b, the coil 63 of the electromagnetic clutch 33 is first excited to attract the armature 67 to the core 62, whereby the armature 67 and the plate 66 are moved away from each other to cancel the restraint of the screw shaft 47. At the same time, the electric motor 30 is driven to rotate the screw shaft 47 of the ball screw mechanism 49, whereby the nut member 31 is advanced from the position shown by the dashed line to a position shown by a solid line in FIG. 4 and hence, a tension is generated in each of the left and right Bowden wires 13, 13 connected to the equalizer 54 advanced along with the nut member 31 to actuate the left and right wheel brakes 11, 11. If the tensions of the left and right Bowden wires 13, 13 are imbalanced with each other at this time, the equalizer 54 is oscillated in a direction of an arrow A–A' in FIG. 3 about the upper support shaft 51 and the lower support shaft 52, to equalize the tensions of the left and right Bowden wires 13, 13, whereby braking forces of the same magnitude are generated in the left and right wheel brakes 11, 11.

As described above, the driving force of the electric motor 30 is transmitted to the Bowden wires 13, 13 through the ball screw mechanism 49 capable of transmitting the driving force reversibly and hence, reaction forces to the brake-operating forces applied to the Bowden wires 13, 13 (namely, the tensions of the Bowden wires 13, 13) are applied as loads on the electric motor 30. Therefore, if the relationship between the magnitude of the load of the electric motor 30 and the magnitude of the brake-operating forces is stored previously, the magnitude of the brake-operating forces can be controlled to any target value, based on the magnitude of the load on the electric motor 30 (e.g., a current value of the electric motor 30 detected by the current sensor 29c).

In addition, the ball screw mechanism 49 is accompanied by a small friction force and a small looseness and thus has a good transmitting efficiency, so that even if the small-sized lightweight electric motor 30 is used, a sufficient responsiveness can be ensured and moreover, a noise during operation can be reduced. Further, the ball screw mechanism 49 is of a small size, as compared with a reduction gear mechanism and hence, the entire electrically-operated parking brake device 12 can be small-sized.

When the electrically-operated parking brake device 12 is operated in this manner to generate braking forces required for the left and right wheel brakes 11, 11, the electric motor 30 is terminated and the coil 63 of the electromagnetic clutch 33 is deexcited, whereby the rotor 64 is clamped between armature 67 and the plate 66 by the biasing forces of the first coil springs 68 to restrain the rotation of the screw shaft 47. Thus, even if the tensions of the Bowden wires 13, 13 are transmitted back to the screw shaft 47 of the ball screw mechanism 49, it is possible to reliably prevent the screw shaft 47 from being disadvantageously rotated to weaken the braking forces of the wheel brakes 11, 11.

Additionally, the armature 67 is driven by the electromagnetic clutch 33 to control the rotation of the screw shaft 47 by a friction force generated between the plate 66 together with the armature 67 and the rotor 65. Therefore, the inertia force of the electric motor 30 can be controlled precisely to control the stopped position accurately, as compared with a case where a rotation-inhibiting means such as a ratchet mechanism is used. Moreover, the restraint of the rotor 65 and the cancellation of the restraint are conducted gently through the friction force and hence, an operational sound can be reduced.

Now, when the electrically-operated parking brake control unit ECU21 or the actuating/canceling switch 29b outputs a command to cancel the operation of the electrically-operated parking brake device 12, the coil 63 of the electromagnetic clutch 33 is first excited to cancel the restraint of the screw shaft 47, and in this state, the electric motor 30 is driven in a direction reverse from the above-described direction to reverse the screw shaft 47 of the ball screw mechanism 47 and to retract the nut member 31 from the position shown by the solid line to the position shown by the dashed line in FIG. 4, whereby the operation of the left and right brakes 11, 11 can be cancelled.

When the electrically-operated parking brake device 12 is in operation so that the wheel brakes 11, 11 generate the braking forces, if the electric motor 30 or its control system has failed, it is impossible to cancel the operation of the electrically-operated parking brake device 12 by the electric motor 30 and hence, it is necessary to conduct the cancellation of the operation by a manual operation provided by the occupant. For this purpose, when the hexagonal wrench 80 is inserted into the hexagonal bore 75a in the rotary shaft 75 to push the rotary shaft 75 down to a second position against the biasing force of the coil spring 78, as shown in FIG. 8, the driving bevel gear 79 of the rotary shaft 75 is meshed with the follower bevel gear 84 of the screw shaft 47.

In operative association with this, the rear end of the lever 82 supported at its intermediate portion by the pin 81 is pushed down, and the front end of the lever 82 is pushed up and hence, the canceling member 72 connected to the front end of the lever 82 is raised between plate 66 and the armature 67. As a result, the slants 71b, 71b; 71c, 71c provided on the canceling member 72 ride onto the slants 67a, 67a; 67b, 67b provided on the armature 67 and hence, the plate 66 and the armature 67 are moved away from the rotor 65 against the biasing forces of the first coil springs 68, so that the electromagnetic clutch 33 is canceled manually without excitation of the coil 63.

Figure 8:
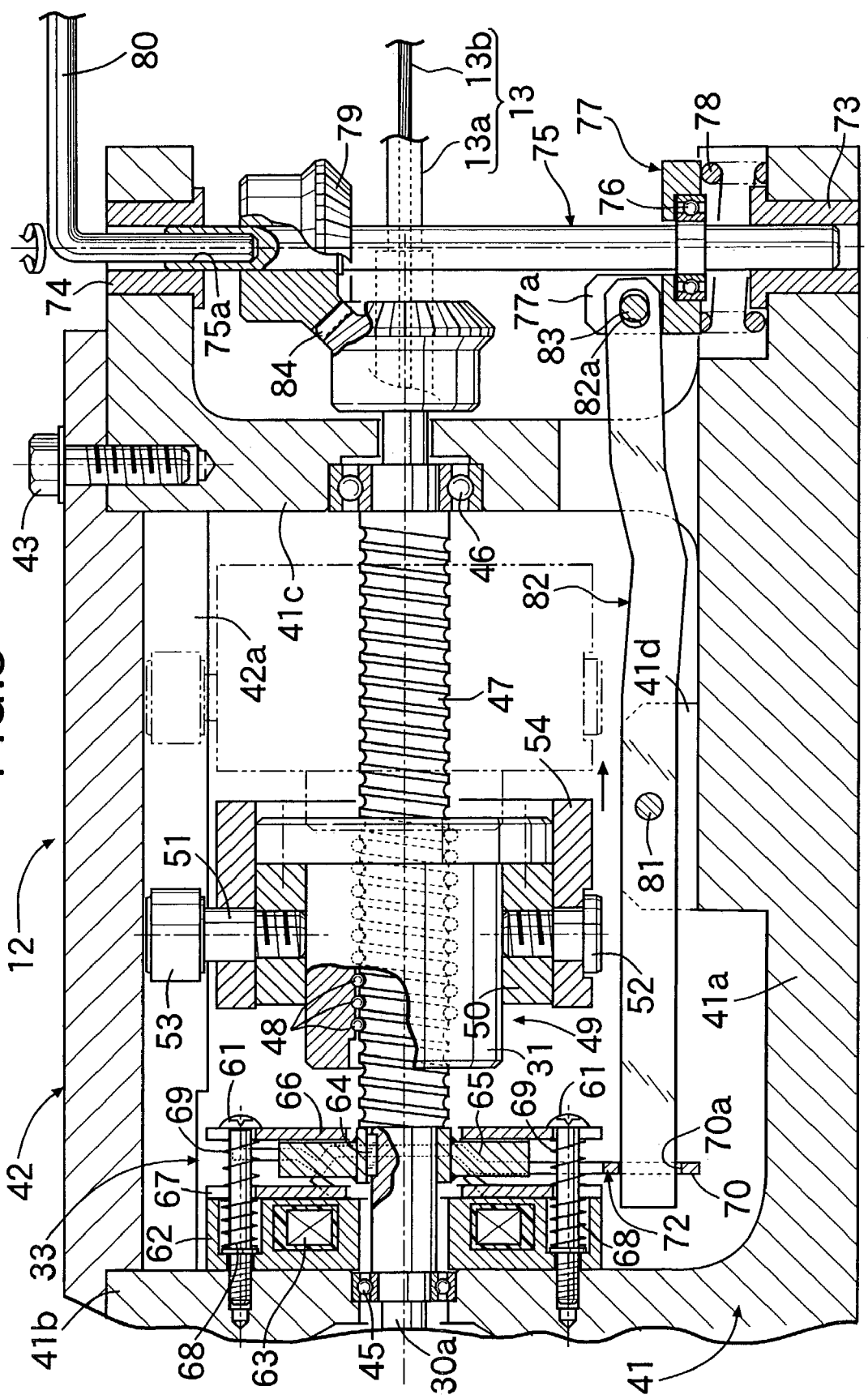
FIG. 8 is a view similar to FIG. 4 for explaining the operation.
Figure 9:
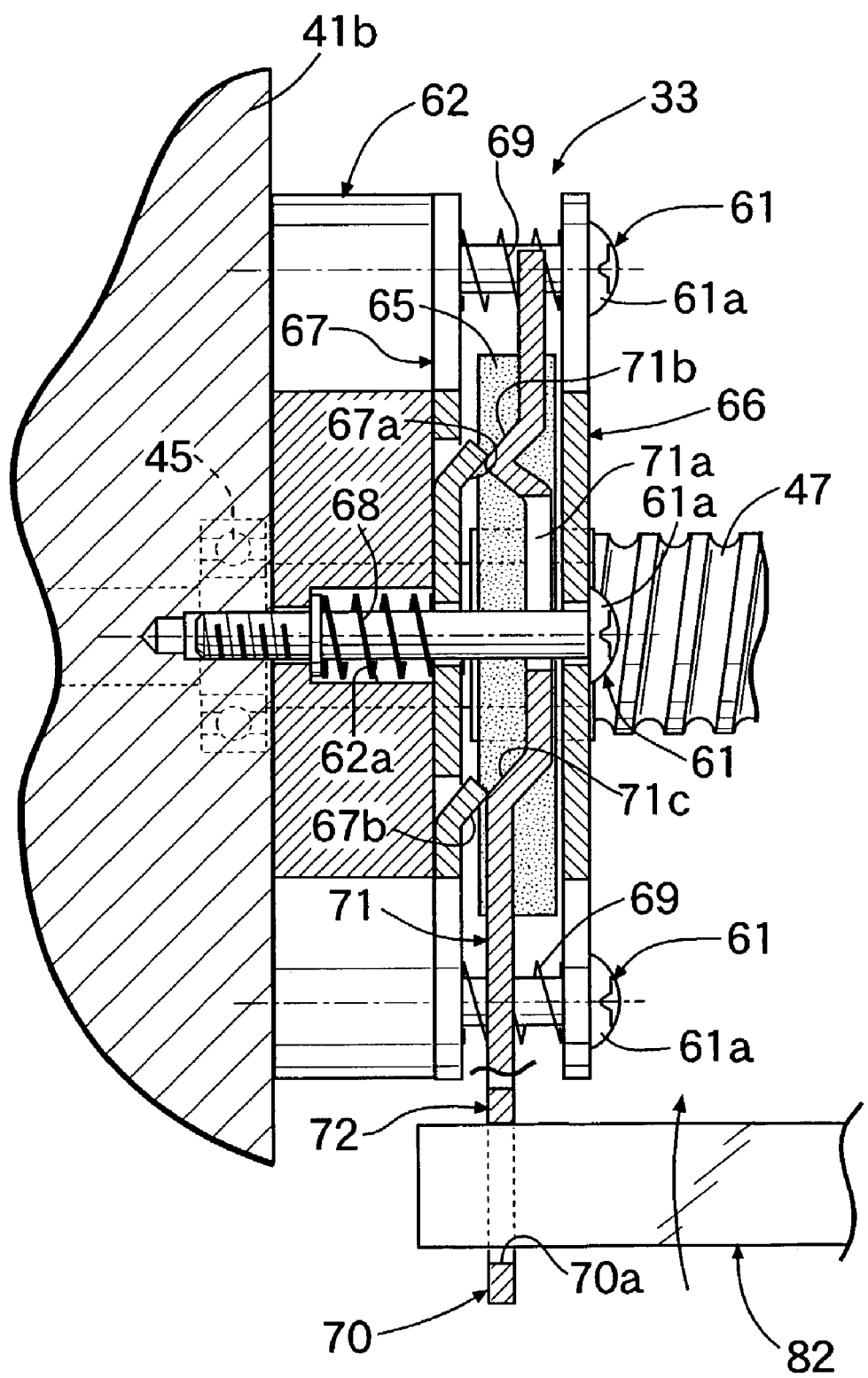
FIG. 9 is a view similar to FIG. 7 for explaining the operation.

Therefore, it is possible to rotate the screw shaft 47 through the driving bevel gear 79 and the follower bevel gear 84 meshed with each other, to move the nut member 31 from the position shown by the solid line to the position shown by the dashed line in FIG. 8 by operating the hexagonal wrench 80 from this state to rotate the rotary shaft 75. Thus, the Bowden wires 13, 13 can be loosened to cancel the operation of the wheel brakes 11, 11.

It is of course that when the operation of the electrically-operated parking brake device 12 by the electric motor 30 is impossible due to a trouble, the electrically-operated parking brake device 12 can be operated by the manual operation using the hexagonal wrench 80 as described above. In this case, the hexagonal wrench 80 is rotated in the direction reverse from the above-described direction to move the nut member 31 from the position shown by the dashed line to the position shown by the solid line in FIG. 8.

When the electric motor 30 or its control system has failed, the electrically-operated parking brake device 12 can be operated and the operation thereof can be cancelled manually by a simple operation which comprises only inserting the hexagonal wrench 80 into the hexagonal bore 75a in the rotary shaft 75 to rotate the rotary shaft 75, while pushing it down, leading to a remarkable enhancement in convenience.

The control of the electrically-operated parking brake device 12 will be described below.

Figure 10:
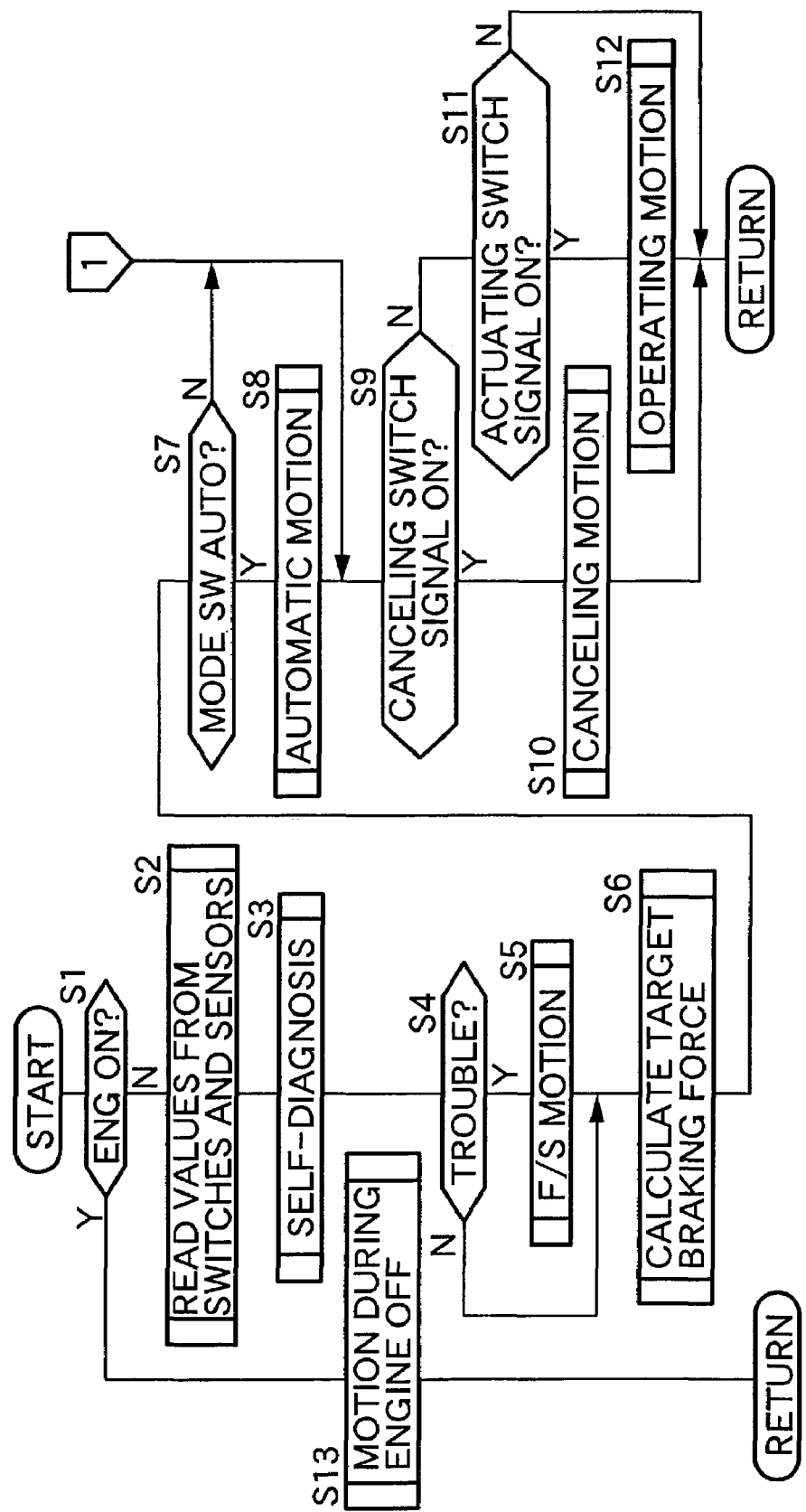
FIG. 10 is a flow chart of a main routine for explaining the operation of the electrically-operated parking brake device.

A flow chart in FIG. 10 is a main routine indicating the outline of the control of the electrically-operated parking brake device 12. When an engine is first started at Step S1, output values from the various switches and sensors (see FIG. 2) are read at Step S2, and it is then self-diagnosed at Step S3 whether there is an abnormality in the output values. If a trouble is found at Step S4, a fail-safe operation such as warning is carried out at Step S5. If no trouble is arisen at Step S4, a target braking force to be generated in the electrically-operated parking brake device 12 is calculated at Step S6. The specific procedures in Step S6 will be described in detail hereinafter.

If the mode changeover switch 29a for changing-over the automatic mode and the manual mode from one to another has selected the automatic mode at subsequent Step S7, the automatic motion of the electrically-operated parking brake device 12 is carried out at Step S8. The automatic motion includes "automatic operation", "automatic cancellation" and "automatic re-pulling operation". Specific nature of them will be described in detail hereinafter. If the actuating/canceling switch 29b for manually actuating or canceling the electrically-operated parking brake device 12 is operated to a canceling side by the driver at subsequent Step S9, the motion of canceling the electrically-operated parking brake device 12 is carried out at Step S10. If the actuating/canceling switch 29b is operated to an actuating side by the driver at Step S11, the motion of actuating the electrically-operated parking brake device 12 is carried out at Step S12. According to Steps S9 to S12, the manual mode is prior to the automatic mode.

When the engine is stopped at Step S1, the motion during stoppage of the engine such as the turning-off of a power source for the electrically-operated parking brake control device ECU21 is carried out at Step S13.

The nature of "calculation of target braking force" at Step S6 of the flow chart in FIG. 10 will be described below.

The braking force generated by the electrically-operated parking brake device 12 is determined by a pulling force for the Bowden wires 13, 13. The pulling force includes a first target pulling force BfT1, a second target pulling force BfT2 and a third target pulling force BfT3.

The first target pulling force BfT1 is a pulling force when the electrically-operated parking brake device 12 normally functions, and is determined according to the following equation:

$$BfT1 = (Hi\text{-}sel[Bf0, Bf1] + k1) \times k2 \quad (1)$$

Bf0 in the equation (1) is a pulling force for the Bowden wires 13, 13 for generating a braking force for controlling an own-weight moving force of the vehicle due to the inclination of a road surface in the electrically-operated parking brake device 12, and is provided according to the following equation:

$$Bf0 = |\text{vehicle weight} \times \text{amount of inclination}| \times Bk1 \quad (2)$$

In this equation, the amount of inclination corresponds to sin θ wherein θ represents an inclination angle of a road surface detected by the inclination sensor 29e. A braking coefficient Bk1 is determined by a loss of friction of each of the Bowden wires 13, 13 of the electrically-operated parking brake device 12, a frictional coefficient of a friction pad of each of the brake shoes 15 and 16 and the like.

Bf1 in the equation (1) is a pulling force for the Bowden wires 13, 13 for generating a braking force equal to that generated by a service brake, and is provided according to the following equation:

$$Bf1 = \text{braking pressure } P0 \text{ at stoppage} \times Bk2 \quad (3)$$

In the equation (3), the braking pressure P0 at stoppage is a braking pressure (a pressure in a master cylinder) detected by the master cylinder pressure sensor 29h, and a braking coefficient Bk2 is determined by a loss of a braking liquid pressure of the service brake, the frictional coefficient of the friction pad and the like.

Hi-sel in the equation (1) means that any larger one of Bf0 and Bf1 is selected (high select). A coefficient k1 added to any larger one of Bf0 and Bf1 is varied depending on the state of the vehicle as shown in Table 1, and is used to ensure that the first target pulling force BfT1 does not become zero. In the case where a command for actuating the electrically-operated parking brake device 12 is issued by the actuating/canceling switch 29b in a state in which the brake pedal is not depressed in a flat road, if there is not the coefficient k1, the first target pulling force BfT1 becomes zero.

TABLE 1

| | k1 |
|---|---|
| Usual (initial value) | Pulling force corresponding to 0.1 G |
| Downward slope + D range | +Pulling force corresponding to creeping force in D range |
| Upward slope + R range | +Pulling force corresponding to creeping force in R range |

As apparent from Table 1, the coefficient k1 is set usually (at an initial value) at a pulling force corresponding to 0.1 G, namely, at a pulling force enabling a deceleration of 0.1 G to be generated. However, when the vehicle is on a downward slope with the D range selected, a pulling force corresponding to a creeping force in the D range is added to 0.1 G which is the initial value. When the vehicle is on an upward slope with the R range selected, a pulling force corresponding to a creeping force in the R range is added to 0.1 G which is the initial value. The reason is that if a creeping force is added in the same direction as an own-weight moving force caused by an inclination of a road surface, it is necessary to generate a stronger braking force by the electrically-operated parking brake device 12.

TABLE 2

| Motion mode F | | k2 |
|---|---|---|
| =0 (non-operative) | Usual (at initial value) | 1.2 |
| | P range or N range | 1.5 |
| =1 | First increasing operation | 1.5 |
| =2 | Second increasing operation | 2.0 |

The coefficient k2 in the equation (1) is used to compensate for a reduction in braking force due to a drop in temperature and is varied depending on the state of a motion mode flag, as shown in Table 2. As apparent from Table 2, when the electrically-operated parking brake device 12 is in a non-operative state in which the motion mode flag=0, the coefficient k2 is normally set at 1.2 (initial value) and at 1.5 when the P range or the N range has been selected. The reason is that the coefficient k2 is liable to be influenced by a change in temperature, because there is a possibility that the P range or the N range is likely to be continued for a long period of time, as compared with the other ranges.

At the time of the first re-pulling operation in which the motion mode flag=1, the coefficient k2 is set at 1.5, and at the time of the second re-pulling operation in which the motion mode flag=2, the coefficient k2 is set at 2.0. The re-pulling operation is an operation of pulling the Bowden wires 13, 13 of the electrically-operated parking brake device 12 further strongly to increase the braking force, and the detail thereof will be described hereinafter.

As described above, the first target pulling force BfT1 is determined basically in consideration of an amount of inclination of a road surface, and a creeping force of the vehicle is not taken into consideration for this determination. Therefore, when the range is shifted from the D range or the R range in which a creeping force is generated during operation of the electrically-operated parking brake device 12 to the N range in which no creeping force is generated, there is no possibility that the braking force generated by the electrically-operated parking brake device 12 becomes insufficient by a degree corresponding to the creeping force so that the vehicle is moved.

The second target pulling force BfT2 is a pulling force for use in the electrically-operated parking brake device 12 in place of the service brake, when the service brake is fallen into a defective state during traveling of the vehicle (e.g., at a vehicle speed of 2 km/hr or more); and is set at a value determined by multiplying a pulling force generating a deceleration of 0.1 G by the frequency of operations of the actuating/canceling switch 29b to the actuating side. An upper limit of the frequency of operations of the actuating/canceling switch 29b to the actuating side is three. When the actuating/canceling switch 29b is operated once to the actuating side, a deceleration of 0.1 G is generated; when the actuating/canceling switch 29b is operated twice to the actuating side, a deceleration of 0.2 G is generated; and when the actuating/canceling switch 29b is operated three or more times to the actuating side, a deceleration of 0.3 G is maintained. The magnitude of the deceleration is independent of the vehicle speed and also of a time interval of operation of the actuating/canceling switch 29b to the actuating side.

The third target pulling force Bft3 is a pulling force when the inclination sensor 29e is has failed; and is set at a value determined by multiplying a pulling force to stop the vehicle on a road surface inclined at 30° by the coefficient k2 shown in Table 2.

The nature of "automatic motion" at Step S8 of the flow chart shown in FIG. 10 will be described below with reference to flow charts shown in FIGS. 11 to 14.

First, it is determined at Step S101 whether a presumed vehicle speed calculated based on an output from the wheel speed sensor 29g is zero. In general, the vehicle speed is calculated as an average value of wheel speeds of follower wheels, but when the wheels have been locked on an iced road surface or the like, an actual vehicle speed does not become zero even if the above-described vehicle speed becomes zero. Therefore, an actual vehicle speed is presumed and used herein.

If the presumed vehicle speed is zero at Step S101; the brake switch 29i is in a turned-on state at Step S102 (namely, the brake pedal is being depressed); an accelerator pedal is not depressed at Step S103; and the previous value of the presumed vehicle speed is not zero at Step S104, namely, when the vehicle has been stopped for the first time in a current loop, a braking pressure (a master cylinder pressure) detected by the master cylinder pressure sensor 29h is determined as a topping braking pressure P0. If the previous value of the presumed vehicle speed is zero at Step S104, namely, when the vehicle remains stopped continuously from the previous loop, a stoppage-deciding timer is incremented at Step S106.

If a counted value in the stoppage-deciding timer is equal to or larger than a defined value (e.g., 200 m sec) at the subsequent Step S107, it is decided that the vehicle has been stopped. On the other hand, if the presumed vehicle speed is not zero at Step S101, or if the brake pedal is not depressed at Step S102, or if the accelerator pedal has been depressed at Step S103, the stoppage-deciding timer is reset at Step S108; the stopping braking pressure P0 is set at an initial value (e.g., 2 MPa) at Step S109; and a stoppage-retention demanding timer is reset at Step S110.

When the answer is YES at Step S107, i.e., it is decided that the vehicle has been stopped, if a shift position is in the P range at Step S111 and an inclination (including both a forward ascending inclination and a forward descending inclination) of a road surface detected by the inclination sensor 29e exceeds a defined amount (e.g., an inclination of ±10%) at Step S112, the automatic operation of the electrically-operated parking brake device 12 is carried out at Step S113, and the stoppage-retention demanding timer is reset at Step S114.

The reason why the electrically-operated parking brake device 12 is actuated if only the inclination of the road surface exceeds the defined amount when the shift position is in the P range, is that the durability of the electrically-operated parking brake device 12 is taken into consideration, because the retention time of the shift position in the P range is generally long as compared with the other ranges. In the P range, a parking lock for a transmission is operated and hence, if an inclination of a road surface is not particularly large, there is no problem even if the electrically-operated parking brake device 12 is not actuated.

When the shift position is not in the P range at the Step S111, if a stoppage-retention demand is from an outer ECU32 at Step S113, the automatic operation of the electrically-operated parking brake device 12 is preferentially carried out. The stoppage-retention demand from the outside ECU32 is a command from an engine ECU, for example, in a vehicle designed so that the automatic stoppage of an engine (an idling stopping control) is carried out; and a command from a transmission ECU in a vehicle including a continuously variable transmission capable of changing over a weak creep and a strong creep from one to another.

When no stoppage-retention demand is from the outer ECU32 at Step S115, if the master cylinder pressure exceeds the stopping braking pressure P0+the defined amount (e.g., 3 MPa) at Step S116, i.e., if the driver has further depressed the brake pedal, the stoppage-retention demanding timer is incremented at Step S117. If the stoppage-retention demanding timer becomes a defined value (e.g., 500 m sec) or more, it is decided that the driver has an intention to increase the braking force, proceeding to Step S113 at which the automatic operation is carried out. The stoppage-retention demanding timer is mounted in order to confirm that an increase in master cylinder pressure is not temporary due to noise. If the master cylinder pressure does not exceed the stopping braking pressure P0+the defined amount at Step S116, i.e., if the driver has not further depressed the brake pedal, the stoppage-retention demanding timer is reset at Step S119.

Figure 19:
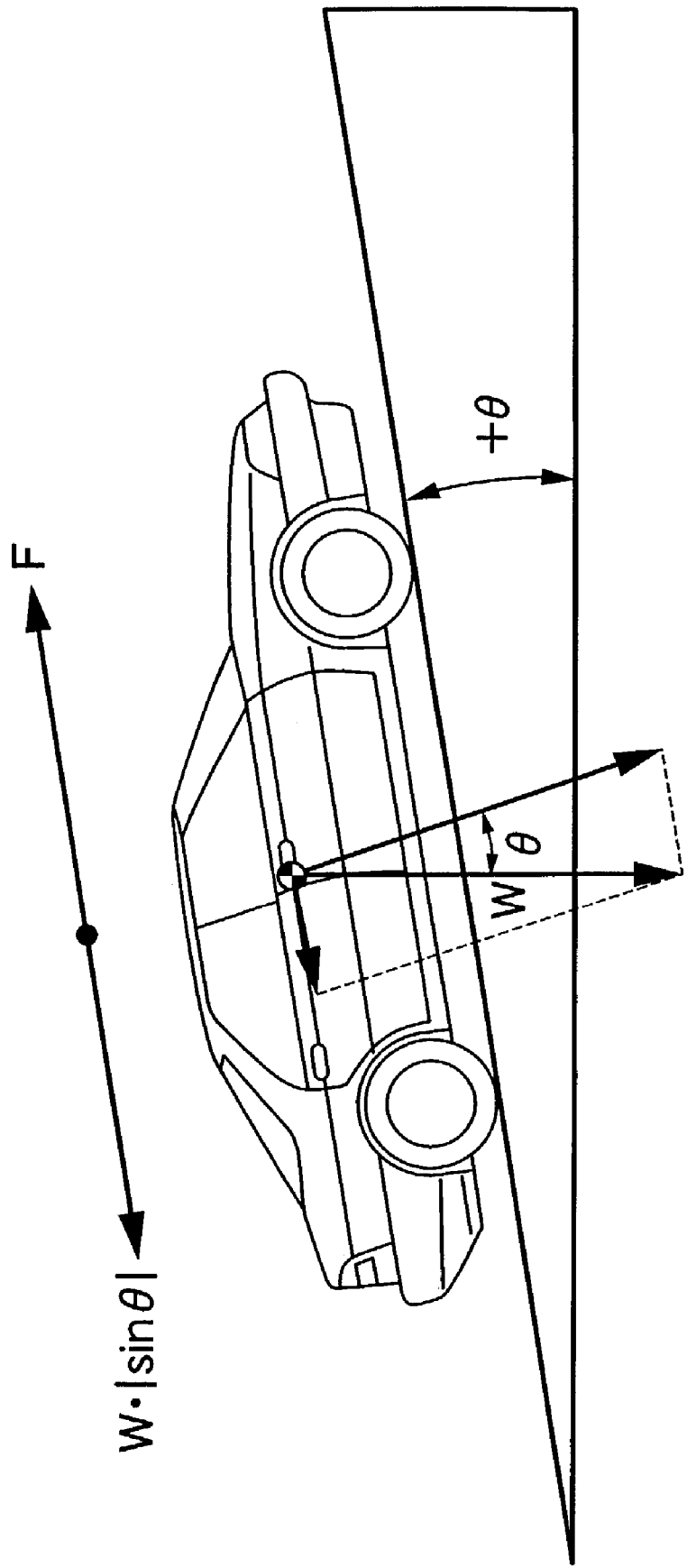
FIG. 19 is a diagram for explaining the operation when a vehicle is on an upward slope.

If the driver has not further depressed the brake pedal at Step 116 or if the driver has depressed the brake pedal at Step 116 and the stoppage-retention demanding timer is not equal to or larger than the defined value (e.g., 500 m sec) at Step 118, it is determined whether the shift position is in the D range at Step S120. If the shift position is in the D range at Step S120, it is determined whether an inclination (a positive value) of a road surface detected by the inclination sensor 29e exceeds θ which is a defined value. The defined value θ used herein is an inclination angle of a road surface when a creeping force F in a direction of forward movement of the vehicle on an upward slope is balanced with W×| sin θ| which is a component of the weight of the vehicle along the road surface (namely, when F=W×| sin θ|), as shown in FIG. 19.

When the answer is YES at Step S121, namely, when a moving force of the vehicle intending to move down an upward slope by a force of gravity is larger than a creeping force of the vehicle intending to move up the upward slope, a slope-judging timer is incremented at Step S122. When the slope-judging timer becomes equal to or larger than a defined value (e.g., 200 m sec) at Step S123, the electrically-operated parking brake device 12 is automatically actuated at Step S124 so that the vehicle is prevented from moving backwards against the driver's intention, and the slope-judging timer is reset at Step S125. The slope-judging timer is mounted in order to compensate for a temporary fluctuation in output from the inclination sensor 29e due to noise or the like.

When the answer at Step S121 is NO, namely, the creeping force of the vehicle intending to move up the upward slope is larger than the moving force of the vehicle intending to move down the upward slope, if the shift position is in a range other than the D range in the previous loop at Step S126, namely, if the shift position has been shifted to the D range for the first time in the current loop, the automatic cancellation 1 of the electrically-operated parking brake device 12 is carried out at Step S127, and the slope-judging timer is reset at Step S128. Also when the shift position is in the D range, namely when the shift position remains in the D range continuously from the previous loop at Step 126, the slope-judging timer is reset at Step S128.

Figure 20:
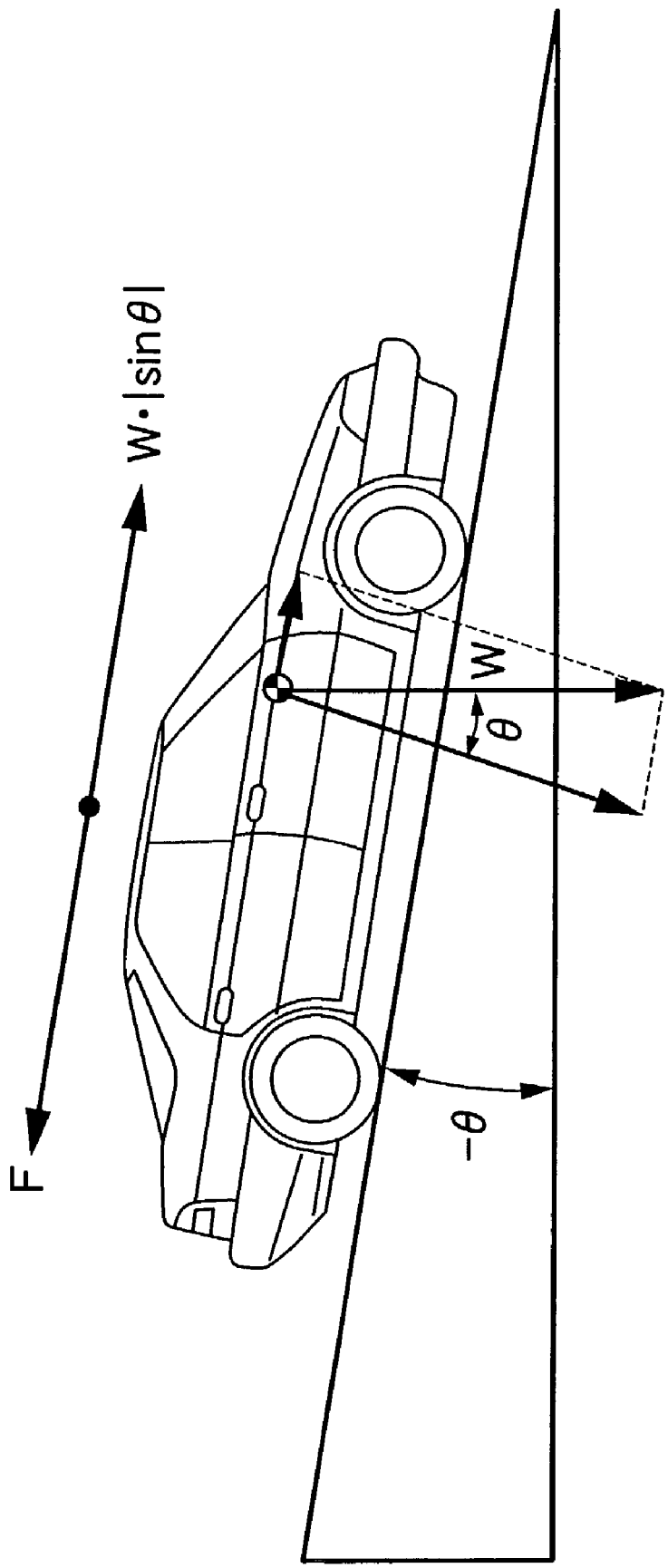
FIG. 20 is a diagram for explaining the operation when the vehicle is on a downward slope.

If the shift position is not in the D range at Step S120 and is in the R rage at Step S129, it is determined at Step S130 whether an inclination (a negative value) of a road surface detected by the inclination sensor 29e is smaller than −θ which is a defined value. The defined value used herein is an inclination angle of a road surface when a creeping force F in a direction of a backward movement of the vehicle on a downward slope is balanced with W×| sin θ| which is a component of the weight of the vehicle along the road surface (namely, when F=W×| sin θ|), as shown in FIG. 20.

When the answer is YES at Step S130, namely, when the moving force of the vehicle intending to move down the downward slope by a force of gravity is larger than the creeping force of the vehicle intending to move up the downward slope, the processing is advanced to Steps S122 to S125. When the slope-judging timer becomes equal to or larger than the defined value at Step S123, the electrically-operated parking brake device 12 is automatically operated at Step S124 so that the vehicle is prevented from moving forwards against the driver's intention.

When the answer is YES at Step S130, namely, when the creeping force of the vehicle intending to move up the downward slope is larger than the moving force of the vehicle intending to move down the downward slope by the force of gravity, if the shift position is in a range other than the R range in the previous loop at Step S131, namely, if the shift position has been shifted to the R range for the first time in the current loop, the automatic cancellation 1 of the electrically-operated parking brake device 12 is carried out at Step S132, and the slope-judging timer is reset at Step S133. Also when the shift position is in the R range in the previous loop at Step S131, namely, when the shift position remains shifted to the R range continuously from the previous loop, the slope-judging timer is reset at Step S133.

Also when the shift position is not in the D range at Step S120 and is not the R range at Step S129, the slope-judging timer is reset at Step S134.

If the presumed vehicle speed is not zero at Step S101, if the brake pedal is not depressed at Step S102, if the accelerator pedal has been depressed at Step S103, or if the counted value in the stoppage-deciding timer is not equal to or larger than the defined value at Step S107, a state of an urgent operation flag is judged at Step S135. The urgent operation flag is used to determine whether the current operation of the electrically-operated parking brake device 12 is an urgent operation. When the driver operates the actuating/canceling switch 29b to the actuating side in a state in which the vehicle speed is equal to or higher than, for example, 10 km/hr, the urgent operation flag is set at "1", and when the driver operates the actuating/canceling switch 29b to the canceling side, the urgent operation flag is set at "0". When the urgent operation flag is set at "1", it cannot be reset at "0" even if the vehicle speed becomes lower than, for example, 10 km/hr, unless the actuating/canceling switch 29b is operated to the canceling side.

If the urgent operation flag for determining whether the current operation of the electrically-operated parking brake device 12 is the urgent operation has been set at "0" at Step S135 (namely, the actuating/canceling switch 29b has been operated to the canceling side), if the shift position is in the D range at Step S136, and if the inclination (the positive value) of the road surface exceeds the defined value θ at Step S137, i.e., if a throttle opening degree exceeds a defined value at Step S138 when the inclination of the upward slope is steeper than that in the balanced state shown in FIG. 19 and hence, there is a possibility that the vehicle is moved down the upward slope by the force of gravity, namely, when the driver has depressed the accelerator pedal in order to inhibit the vehicle from moving down the upward slope against his intention, the electrically-operated parking brake device 12 is cancelled by the automatic cancellation 1 at Step S139.

If the inclination (the positive value) of the road surface does not exceed the defined value θ at Step S137, i.e., if the stoppage-retention demand is not from the outer ECU32 at Step S140 when the inclination of the upward slope is gentler than that in the balanced state shown in FIG. 19 and hence, there is no possibility that the vehicle is moved down the upward slope by the force of gravity, the electrically-operated parking brake device 12 is cancelled by the automatic cancellation 1 or the automatic cancellation 2. Namely, if the inclination of the road surface is smaller than a defined value (e.g., a downward inclination of −15%) at Step S141, namely, is a downward inclination steeper than −15%, the automatic cancellation 2 is carried out at Step S142. If the inclination is not smaller than −15%, the automatic cancellation 1 is carried out at Step S143.

When the shift position is not in the D range at Step S136 and is the R range at Step S144, if the inclination (the negative value) of the road surface is smaller than the defined value −θ at Step S145, i.e., when the inclination of the downward slope is steeper than that in the balanced state shown in FIG. 20 and hence, there is a possibility that the vehicle is moved down the downward slope, if the throttle opening degree exceeds the defined value at Step S 146, namely, when the driver has depressed the accelerator pedal in order to inhibit the vehicle from moving down the downward slope against his intention, the electrically-operated parking brake device 12 is cancelled by the automatic cancellation 1 at Step S139.

If the inclination (the negative value) of the road surface is not smaller than the defined value −θ at Step S145, i.e., if the stoppage-retention demand is not from the outer ECU32 at Step S147 when the inclination of the downward slope is gentler than that in the balanced state shown in FIG. 20 and hence, there is not the possibility that the vehicle is moved down the downward slope, the electrically-operated parking brake device 12 is cancelled by the automatic cancellation 1 or the automatic cancellation 2 at Step S148. Namely, if the inclination of the road surface is larger than the defined value (e.g., an upward inclination of 10%) at Step S148, namely, is an upward inclination steeper than 10%, the automatic cancellation 2 is carried out at Step S149, and if the inclination exceeds 10%, the automatic cancellation 1 is carried out at Step S150.

When the carrying-out of the automatic operation, the automatic cancellation 1 or the automatic cancellation 2 is decided in the above-described manner, the movement of the stoppage of the vehicle is judged at Step S151. More specifically, when Vw<min> which is a minimum value of values Vw detected by the four wheel sensors 29g is not zero and thus, it is determined that the vehicle is being moved, an integrated movement distance S(n) is calculated at Step S152 according to S(n)=S(n−1)+V×Δt. In this equation, S(n−1) is a previous value of a movement distance; V is a vehicle speed; and Δt is a period of one loop.

When the shift position is in the D range at Step S153, if the movement distance S(n) is smaller than a defined value (e.g., −0.2 m) at Step S154 namely, if the vehicle has been moved backwards by 0.2 m or more, the electrically-operated parking brake device 12 is further strongly operated in order to inhibit the backward movement of the vehicle at Step S157 and thereafter, the movement distance S(n) is reset at zero at Step S158. When the shift position is not in the D range at Step S153 and is in the R range at Step S155, if the movement distance S(n) exceeds a defined value (e.g., 0.2 m) at Step S 156, namely, if the vehicle has been moved forwards by 0.2 m or more, the electrically-operated parking brake device 12 is further strongly operated in order to inhibit the forward movement of the vehicle at Step S157 and thereafter, the movement distance S(n) is reset at zero at Step S158.

When it is determined at Step S151 that the vehicle is at stoppage, or when the shift position is neither in the D range nor in the R range at Steps S153 and S155, the movement distance S(n) is reset at zero at Step S159.

A vehicle speed V is calculated based on pulse signals output by the wheel speed sensors 29g. A technique for determining based on such pulse signals whether the vehicle is being moved forwards or backwards is disclosed in Japanese Patent Application Laid-open No. 6-174736.

Figure 15:
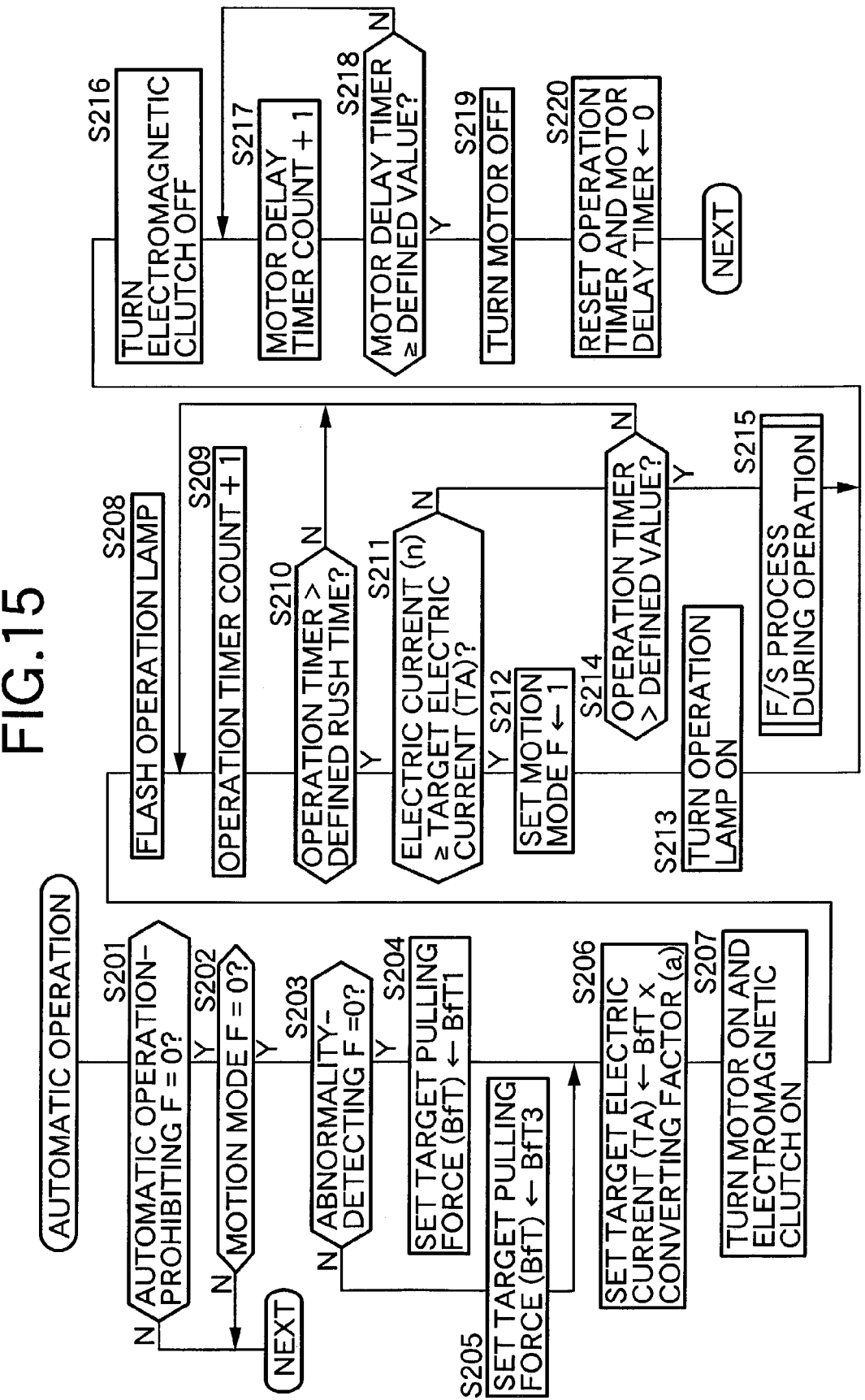
FIG. 15 is a flow chart of an automatic operation routine.

A subroutine for "automatic operation" at Step S113 of the flow chart shown in FIG. 11 and Step S124 of the flow chart shown in FIG. 12 will be described with reference to a flow chart shown in FIG. 15.

First, the state of an automatic operation-prohibiting flag is judged at Step S201. When the automatic operation-prohibiting flag is equal to "0" at Step S201 to indicate that the electrically-operated parking brake device 12 is in a normally operable state, and the motion mode flag is equal to "0" at subsequent Step S202 to indicate that the electrically-operated parking brake device 12 is in a non-operative state, if an abnormality-detecting flag is equal to "0" at subsequent Step S203 to indicate that the inclination sensor 29e is normal, the target pulling force BfT for the electrically-operated parking brake device 12 is set at the first target pulling force BfT1 at Step S204. If the abnormality-detecting flag is equal to "1" to indicate that the inclination sensor 29e is abnormal, the target pulling force BfT for the electrically-operated parking brake device 12 is set at the third target pulling force BfT3 at Step S205.

Figure 11:
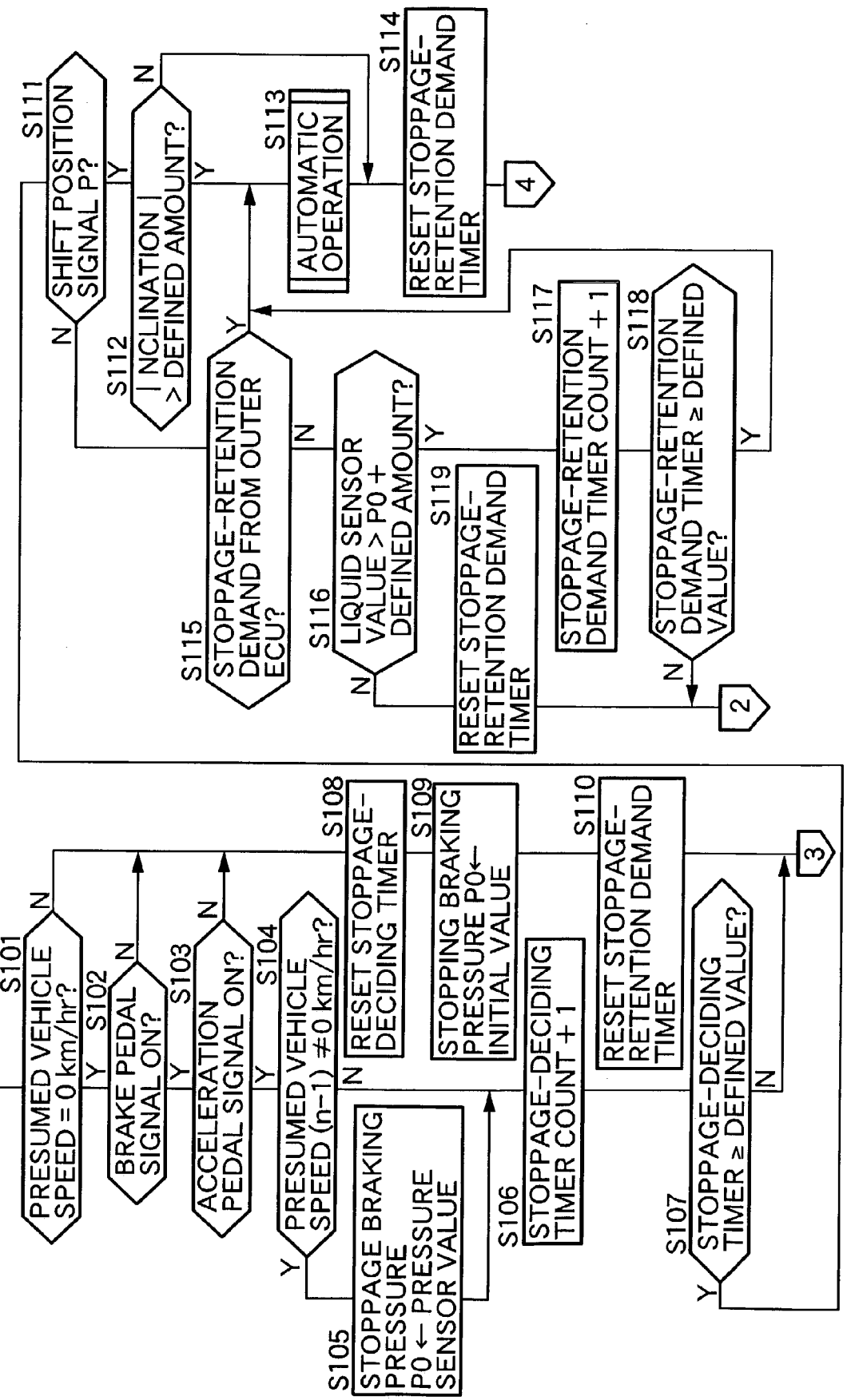
FIG. 11 is a first portion of a flow chart of an automatic motion routine.
Figure 12:
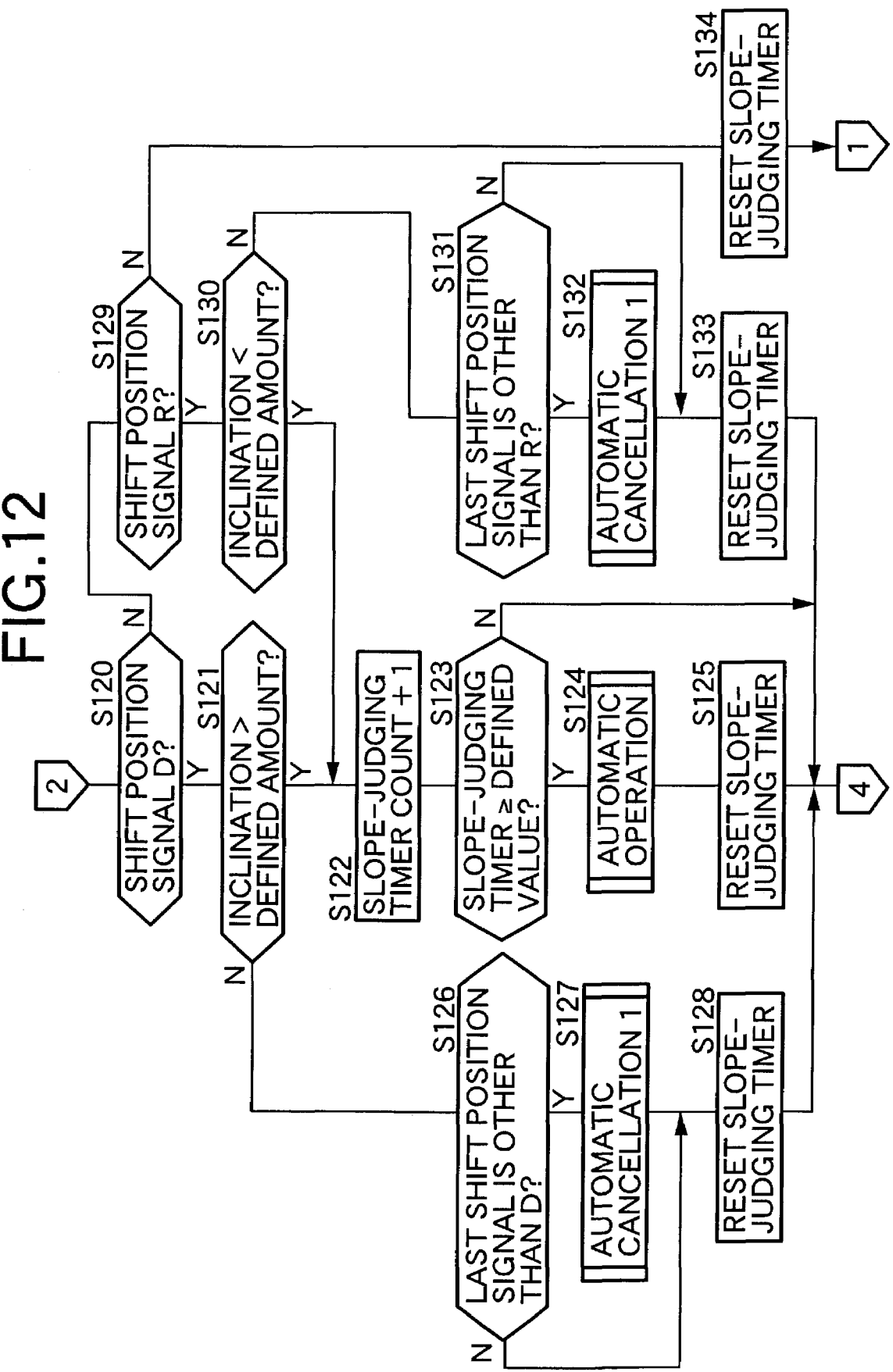
FIG. 12 is a second portion of the flow chart of the automatic motion routine.

When the automatic operation-prohibiting flag is equal to "1" at Step S201 to indicate that the electrically-operated parking brake device 12 is not normal, or when the motion mode flag is equal to "1" at Step S202 to indicate that the electrically-operated parking brake device 12 is in an operative state, the processing is advanced to Step S114 of the flow chart shown in FIG. 11 or Step S125 of the flow chart shown in FIG. 12.

When the target pulling force BfT has been determined at Step S204 or Step S205, a target electric current TA to be supplied to the electric motor 30 for the electrically-operated parking brake device 12 is calculated according to an equation represented by [target electric current TA=target pulling force BfT×converting coefficient a] at Step S206, and electric current is then supplied to the electric motor 30 and the electromagnetic clutch 33 at Step S208. As a result, an operation lamp is flashed at Step S208, and an operation timer is incremented at Step S209. If the operation timer exceeds a defined rush time (e.g., 100 m sec) at Step S210, an electric current value n in the electric motor 30 is compared with the target electric current TA at Step S211. The reason for waiting for the lapse of a time of 100 m sec at Step S210 is that an instantaneous rush electric current supplied to the electric motor 30 is ignored.

If the electric current value n in the electric motor 30 becomes equal to or larger than the target electric current TA at Step S211, the motion mode flag is set at "1" (the electrically-operated parking brake device 12 is in operation) at, Step S212, and the operation lamp is turned on at Step S213. On the other hand, if the electric current value n in the electric motor 30 is not equal to or larger than the target electric current TA at Step S211 and this state is continued for a time of a defined value (e.g., 1.0 sec) or more at Step S214, it is determined at Step S215 that there is a possibility that the Bowden wires 13, 13 of the electrically-operated parking brake device 12 have been broken, and thus, the supplying of the electric current to the electric motor 30 is stopped, and a brake-warning lamp is turned on.

After the supplying of the electric current to the electromagnetic clutch 33 is stopped at subsequent Step S216, a motor delay timer is incremented at Step S217. When the motor delay timer reaches a defined value (e.g., 50 m sec) at Step S218, the supplying of the electric current to the electric motor 30 is stopped at Step S219, and the operation timer and the motor delay timer are set at zero at Step S220 and thereafter, the processing is advanced to Step S114 of the flow chart shown in FIG. 11 or Step S125 of the flow chart shown in FIG. 12. Thus, it is possible to reliably prevent a reduction in braking force due to the looseness of the tension of the Bowden wires 13, 13 by stopping the supplying of electric current to the electric motor 30 after the stoppage of the supplying of electric current to the electromagnetic clutch 33, as described above.

Figure 16:
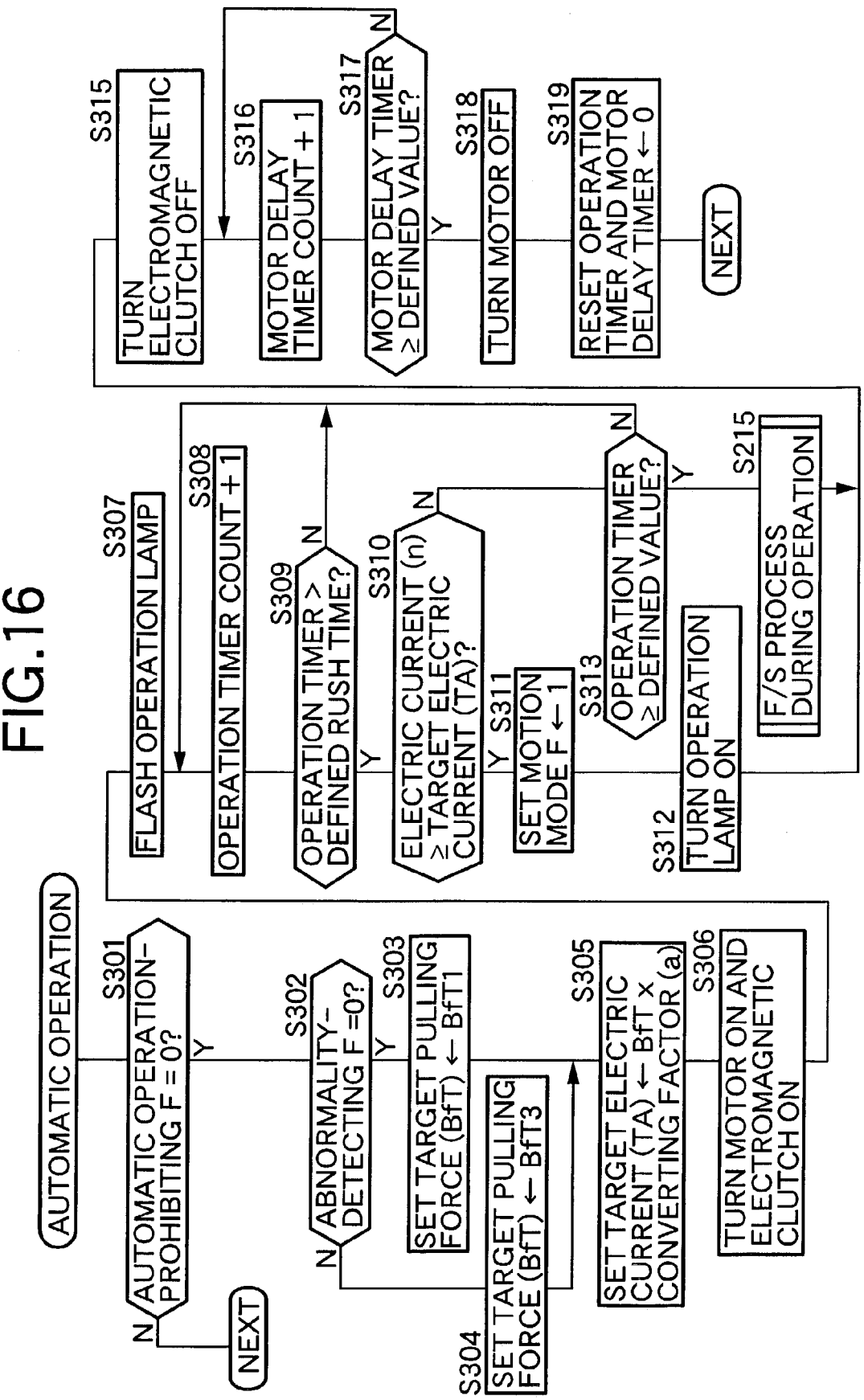
FIG. 16 is a flow chart of an automatic re-pulling operation.

A subroutine for "automatic re-pulling operation" at Step S157 of the flow chart shown in FIG. 14 will be described with reference to a flow chart shown in FIG. 16.

First, if the automatic operation-prohibiting flag is equal to "0" at Step S301 to indicate that the electrically-operated parking brake device 12 is in the normally operable state and the abnormality-detecting flag is equal to "0" at subsequent Step S302 to indicate that the inclination sensor 29e is normal, the target pulling force BfT for the electrically-operated parking brake device 12 is set at the first target pulling force BfT1 at Step S303. If the abnormality-detecting flag is equal to "1" to indicate that the inclination sensor 29e is abnormal, the target pulling force BfT for the electrically-operated parking brake device 12 is set at the third target pulling force BfT3 at Step S304.

Figure 14:
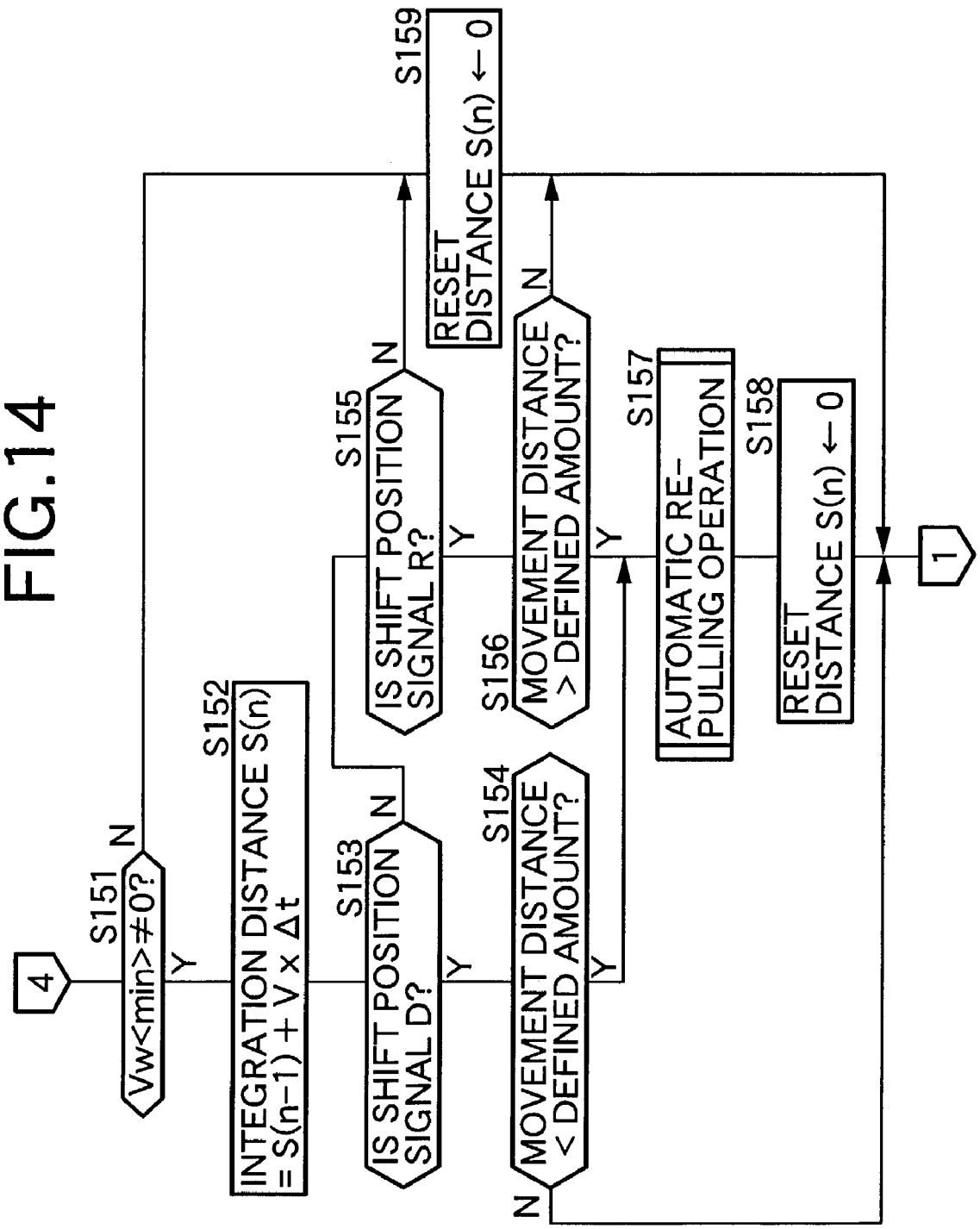
FIG. 14 is a fourth portion of the flow chart of the automatic motion routine.

If the automatic operation-prohibiting flag is equal to "1" at Step S301 to indicate that the electrically-operated parking brake device 12 is not normal, the processing is advanced to Step S158 of the flow chart shown in FIG. 14.

When the target pulling force BfT has been determined at Step S303 or Step S304, a target electric current TA to be supplied to the electric motor 30 for the electrically-operated parking brake device 12 is calculated according to the equation represented by [target electric current TA=target pulling force BfT×converting coefficient a] at Step S305, and electric current is then supplied to the electric motor 30 and the electromagnetic clutch 33 at Step S306. As a result, the operation lamp is flashed at Step S307, and the operation timer is incremented at Step S308. If the operation timer exceeds the defined rush time (e.g., 100 m sec) at Step S309, an electric current value n in the electric motor 30 is compared with the target electric current TA at Step S310. The reason for waiting for the lapse of a time of 100 m sec at Step S309 is that an instantaneous rush electric current supplied to the electric motor 30 is ignored.

If the electric current value n in the electric motor 30 becomes equal to or larger than the target electric current TA at Step S310, the motion mode flag is increased by one at Step S311, and the operation lamp is turned on at Step S312. On the other hand, if the electric current value n in the electric motor 30 is not equal to or larger than the target electric current TA at Step S310, and this state is continued for a time equal to or longer than a defined value (e.g., 1.0 sec) at Step S313, it is determined at Step S314 that there is a possibility that the Bowden wires 13, 13 of the electrically-operated parking brake device 12 have been broken and thus, the supplying of the electric current to the electric motor 30 is stopped, and the brake warning lamp is turned on.

After the supplying of the electric current to the electromagnetic clutch 33 is stopped at subsequent Step S315, the motor delay timer is incremented at Step S316. When the motor delay timer reaches a defined value (e.g., 50 m sec) at Step S317, the supplying of the electric current to the electric motor 30 is stopped at Step S318, and the operation timer and the motor delay timer are set at zero at Step S319 and thereafter, the processing is advanced to Step S158 of the flow chart shown in FIG. 14. Thus, it is possible to reliably prevent a reduction in braking force due to the looseness of the tension of the Bowden wires 13, 13 by stopping the supplying of electric current to the electric motor 30 after the stoppage of the supplying of electric current to the electromagnetic clutch 33, as described above.

Figure 13:
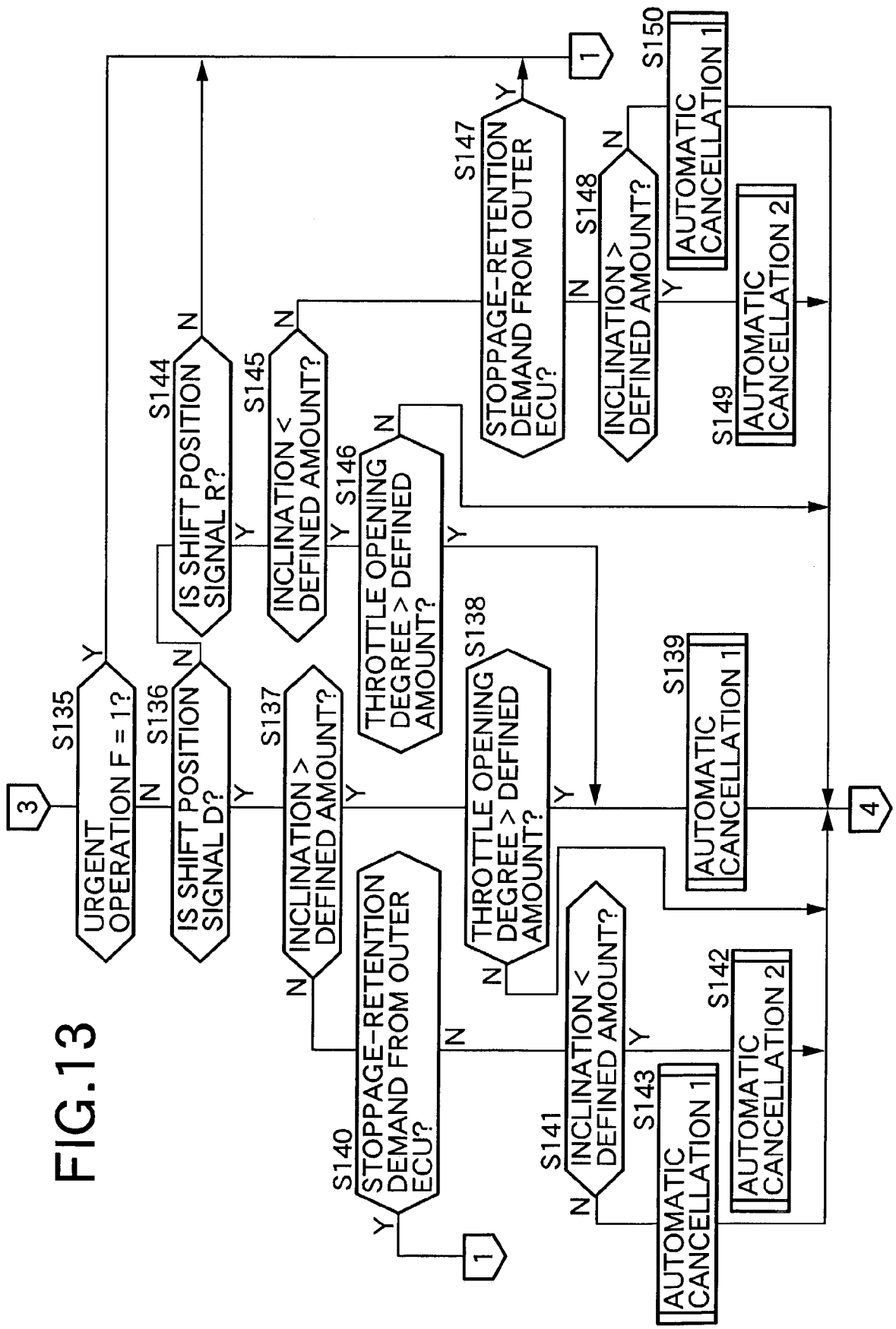
FIG. 13 is a third portion of the flow chart of the automatic motion routine.
Figure 17:
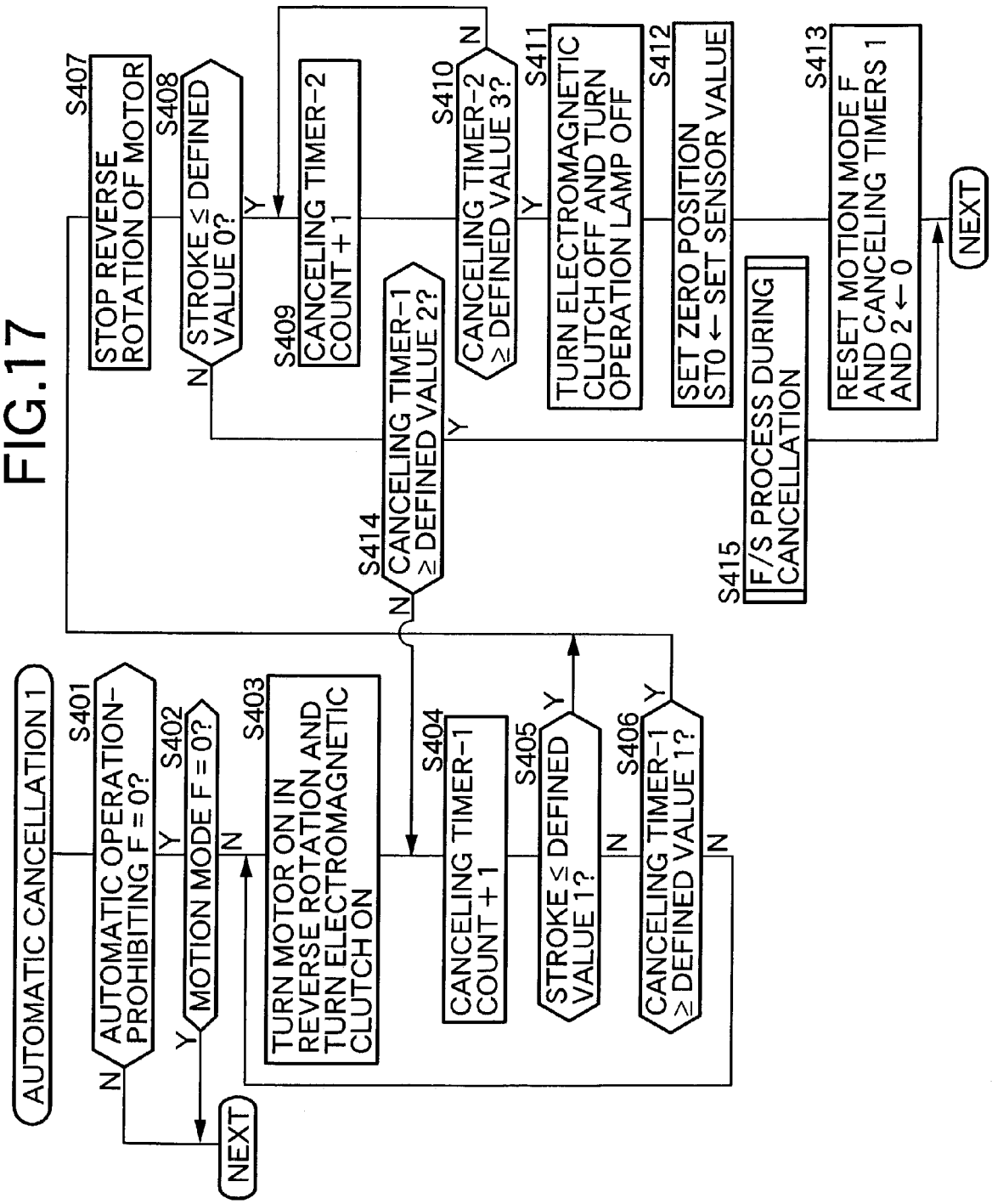
FIG. 17 is a flow chart of an automatic cancellation-1 routine.

A subroutine for "automatic cancellation 1" at Steps S127 and S132 of the flow chart shown in FIG. 12 and Steps S139, S143 and S150 of the flow chart shown in FIG. 13 will be described with reference to a flow chart shown in FIG. 17.

First, if an automatic cancellation-prohibiting flag for determining whether the automatic cancellation of the electrically-operated parking brake device 12 has been prohibited is equal to "0" (namely, the automatic cancellation of the electrically-operated parking brake device 12 is not prohibited) at Step S401, and if the motion mode flag is not equal to "0" at subsequent Step S402 to indicate that the electrically-operated parking brake device 12 is in an operative state, an electric current is supplied to the electric motor 30 for reverse rotation and supplied to the electromagnetic clutch 33 at subsequent Step S403. When the automatic cancellation-prohibiting flag is equal to "1" at Step S401 to indicate that the automatic cancellation of the electrically-operated parking brake device 12 has been prohibited, or when the motion mode flag is equal to "0" at Step S402 to indicate that the electrically-operated parking brake device 12 is in the non-operative state, the processing is shifted as it is to Steps S128 and S133 of the flow chart shown in FIG. 12 or to Step S151 of the flow chart shown in FIG. 14.

When the electric current is supplied to the electric motor 30 for reverse rotation and supplied to the electromagnetic clutch 33 at Step S403, the canceling timer 11 is incremented at Step S404. Thereafter, if the stroke of the electrically-operated parking brake device 12 detected by the stroke sensor 29d is equal to or smaller than a defined value 1 (e.g., a position 5 mm in front of a zero position ST0) at Step S405, or if the canceling timer 1 is equal to or larger than a defined value (e.g., 500 m sec) at Step S406, the supplying of the electric current supplied to the electric motor 30 for reverse rotation is stopped at Step S407.

The stopping of the electric motor 30 in the position 5 mm in front of the zero position ST0 at Step S405 is for the purpose of preventing the electric motor 30 from excessively moving due to the inertia. In addition, the reason why the supplying of the electric current to the electric motor 30 for reverse rotation is stopped when the canceling timer 1 is equal to or larger than the defined value at Step S406, is for the purpose of preventing the electric motor 30 from excessively rotating in reverse when the stoke sensor 29d is in trouble.

When the stroke of the electrically-operated parking brake device 12 is equal to or smaller than a defined value 0 (ag., a position 2 mm in front of the zero position ST0 wherein 2 mm is a tolerance) due to the inertia at subsequent Step S408, the canceling timer 2 is incremented at Step S409. If the canceling timer 2 is equal to or larger than a defined value 3 (e.g., 0.2 see) at Step S410, the supplying of the electric current to the electromagnetic clutch 33 is stopped at Step S411 to turn the operation lamp off and the output value from the stroke sensor 29d is defined as the zero position ST0 at Step S412. Further, the motion mode flag, the canceling timer and the canceling timer 2 are reset at zero at Step S413 and thereafter, the processing is shifted to Steps S128 and S133 of the flow chart shown in FIG. 12 or to Step S151 of the flow chart shown in FIG. 14.

On the other hand, if the stroke of the electrically-operated parking brake device 12 is not equal to or smaller than the defined value 0 at Step S408, freezing cancellation is carried out at Step S415, for example, by the re-pulling operation of the electrically-operated parking brake device 12 after waiting until the canceling timer 1 reaches a defined value 2 (e.g., 5 sec) at Step S414. This is because if the stroke is not returned to the defined value 0 although 5 sec is elapsed, there is a possibility that freezing has occurred in the power-transmitting system between the electrically-operated parking brake device 12 and the wheel brakes 11, 11.

Figure 21:
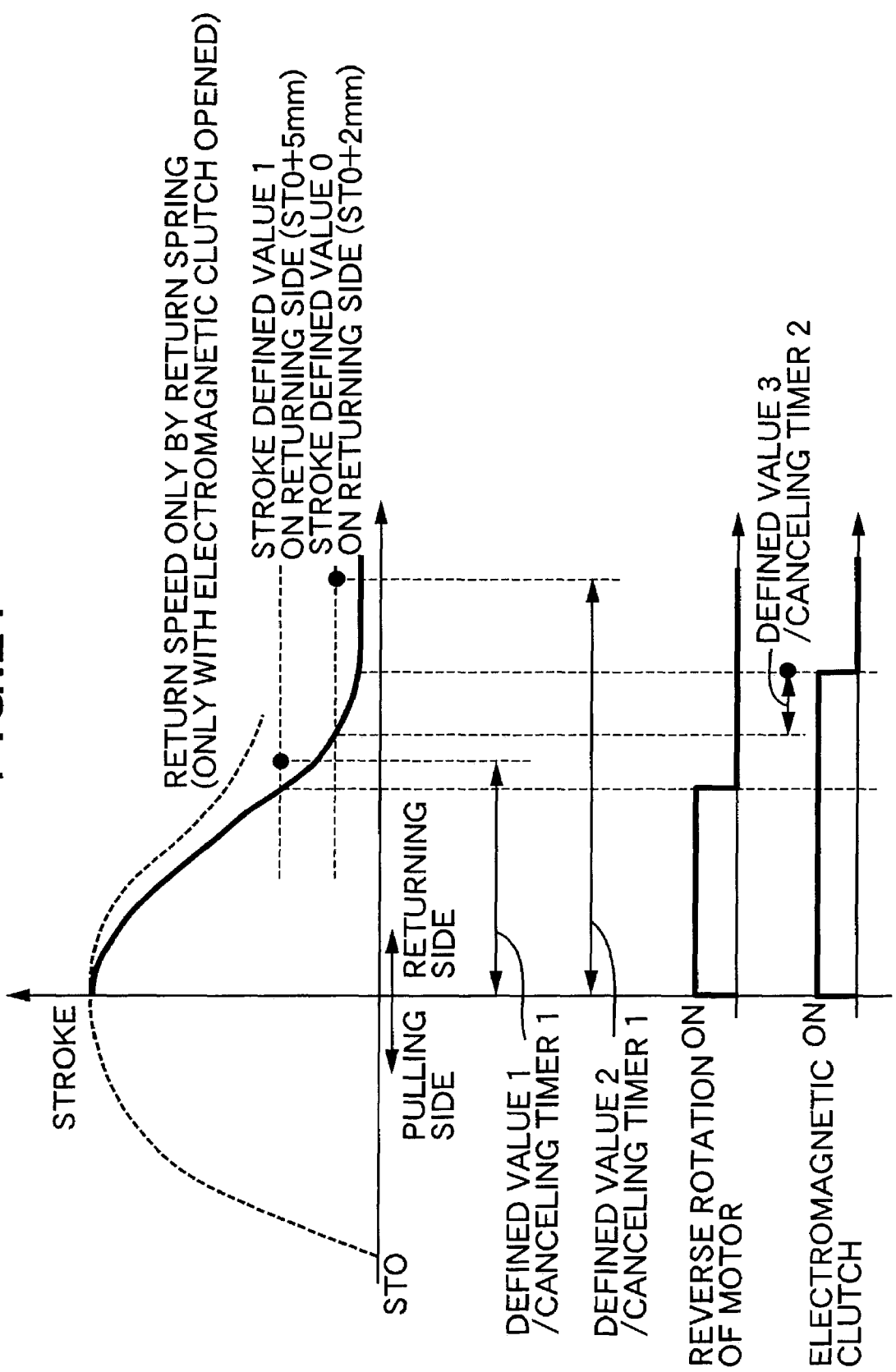
FIG. 21 is a time chart showing one example of the operation of the automatic cancellation 1.

One example of the operation of the automatic cancellation 1 of the electrically-operated parking brake device 12 is shown in a time chart shown in FIG. 21.

After operation of the electrically-operated parking brake device 12, the electric current is supplied to the electromagnetic clutch 33 to be cancelled and supplied to the electric motor 30 for reverse rotation. When the stroke of the electrically-operated parking brake device 12 reaches the defined value 1 (the position 5 mm in front of the zero position ST0), the reverse rotation of the electric motor 30 is stopped. In this case, the maximum time of rotating the electric motor 30 in reverse is limited by the defined value 1 (500 m sec) of the canceling timer 1. The supplying of the electric current to the electromagnetic clutch 33 is continued even after the reverse rotation of the electric motor 30 is stopped, and hence, when the stroke further approaches to the zero position ST0 due to the inertia of the electric motor 30 and reaches to the defined value 0 (the position 2 mm in front of the zero position ST0), the canceling timer 2 is started. The driver waits for the stroke to further approach to the zero position ST0 by continuously supplying the electric current to the electromagnetic clutch 33 during counting of the canceling timer 2, and when the defined value 3 (0.2 sec) has been elapsed, the supplying of the electric current to the electromagnetic clutch 33 is stopped. If the stroke is not returned to the defined value 0 (the position 2 mm in front of the zero position ST0) although the defined value 2 (5 sec) of the canceling timer 1 has been elapsed as a result of the above-described operation, it is determined that freezing has occurred, to shift to a fail-safe mode.

Figure 18:
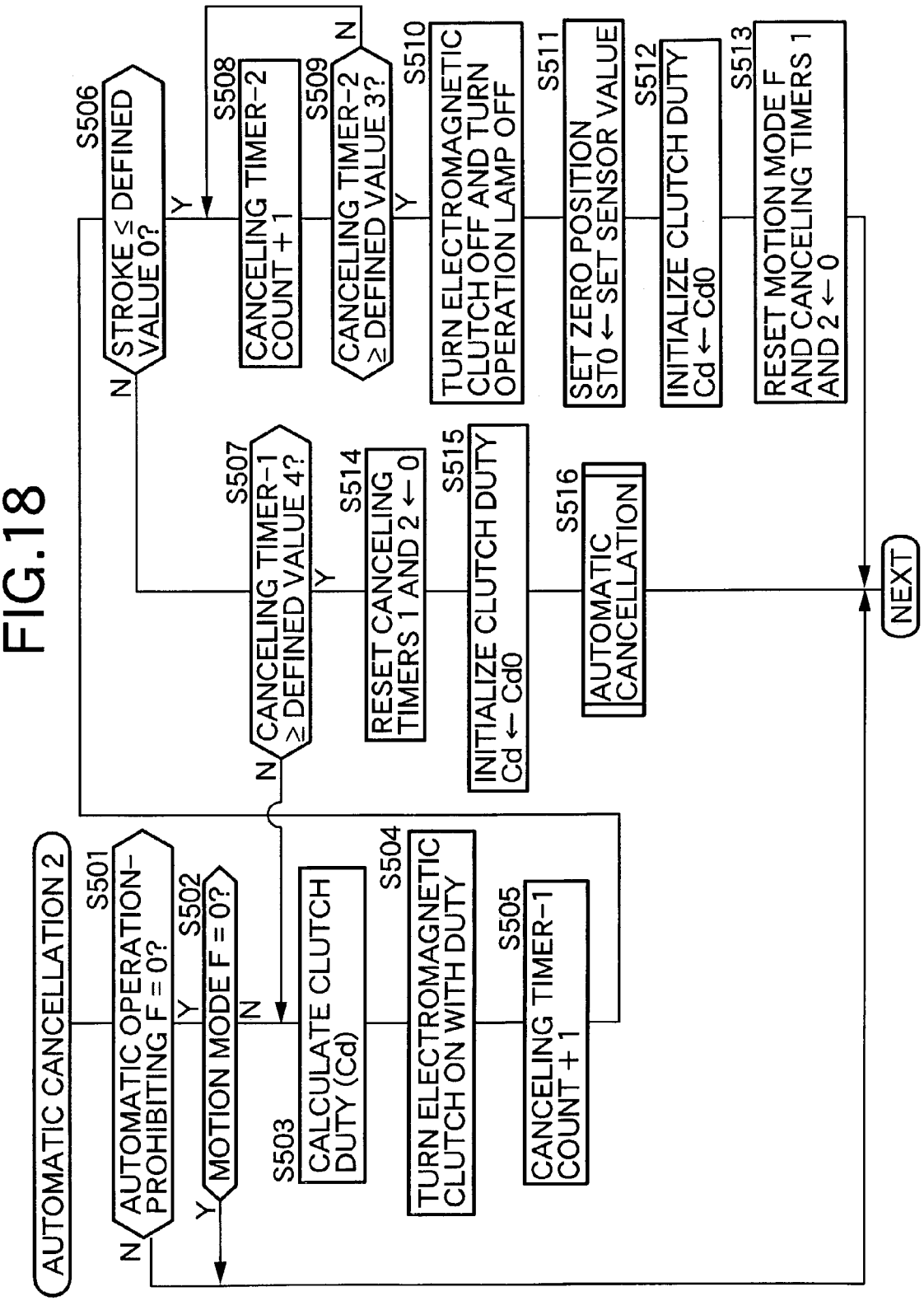
FIG. 18 is a flow chart of an automatic cancellation-2 routine.

A subroutine for "automatic cancellation 2" at Steps S142 and S149 of the flow chart shown in FIG. 13 will be described below with reference to a flow chart shown in. FIG. 18.

First, when the automatic cancellation-prohibiting flag is equal to "0" at Step S501 to indicate that the automatic cancellation of the electrically-operated brake device 12 is not prohibited, and the motion mode flag is not equal to "0" at the subsequent Step S502 to indicate that the automatic cancellation of the electrically-operated brake device 12 is in an operative state, a duty Cd of the electromagnetic clutch 33 is calculated at Step S503 according to the following equation:

$$Cd=Cd(n-1)+OFT \times 10 \times (Dk1-|\text{value detected by the inclination sensor}|) \qquad (4)$$

wherein OFT is a counted value of the canceling timer 1, which will be described hereinafter; Dk1 is a duty calculating factor (e.g., 0.5); and an initial value Cd0 of the duty Cd is 50%. Therefore, the duty Cd is increased from a minimum value Cdmin equal to 50% to a maximum value Cd max equal to 100% in accordance with an increase in counted value OFT of the canceling timer 1. In this case, as value detected by the inclination sensor is larger, namely, as the inclination of a road surface is steeper, the duty Cd is increased more slowly.

When the duty Cd of the electromagnetic clutch 33 has been calculated in the above-described manner at Step S503, electric current is supplied to the electromagnetic clutch 33 with the duty Cd at subsequent Step S504, and the canceling timer 1 (the above-described OFT) is incremented. Steps S503 to S507 are repeated until the stroke reaches the defined value 0 (the position 2 mm in front of the zero position ST0) at Step S506 and the canceling timer 1 reaches defined value 4 (e.g., 2 sec) at Step S507. During this process, the duty Cd is increased gradually.

As a result, when the stroke has reached the defined value 0 (the position 2 mm in front of the zero position ST0) at Step S506, the canceling timer 2 is incremented at Step S508. When the canceling timer 2 becomes equal to or larger than a defined value 3 (e.g., 0.2 sec) at Step S509, the supplying of the electric current to the electromagnetic clutch 33 is stopped at Step S510 to turn the operation lamp off; the output value from the stroke sensor 29d is defined as the zero position ST0 at Step S511; and the duty Cd is reset at 50% which is the initial value at Step S512. Further, the motion mode flag, the canceling timer 1 and the canceling timer 2 are reset at zero at Step S513 and thereafter, the processing is shifted to Step S151 of the flow chart shown in FIG. 14.

When the canceling timer 1 becomes equal to or larger than the defined value 4 (e.g., 2 sec) at Step S507, the canceling timer 1 and the canceling timer 2 are reset at zero at Step S514, and the duty Cd is reset at 50% which is the initial value at Step S515. Then, the automatic cancellation 1 described in the flow chart shown in FIG. 17 is carried out at Step S516 to forcibly cancel the electrically-operated parking brake device 12 by the reverse rotation of the electric motor 30 and thereafter, the processing is shifted to Step S151 of the flow chart shown in FIG. 14.

Also when the automatic cancellation-prohibiting flag is not equal to "0" at Step S501 to indicate that the automatic cancellation of the electrically-operated parking brake device 12 has been prohibited, or the motion mode flag is equal to "0" at Step S502 to indicate that the electrically-operated parking brake device 12 is in the non-operative state, the processing is shifted to Step S151 of the flow chart shown in FIG. 14.

Figure 22:
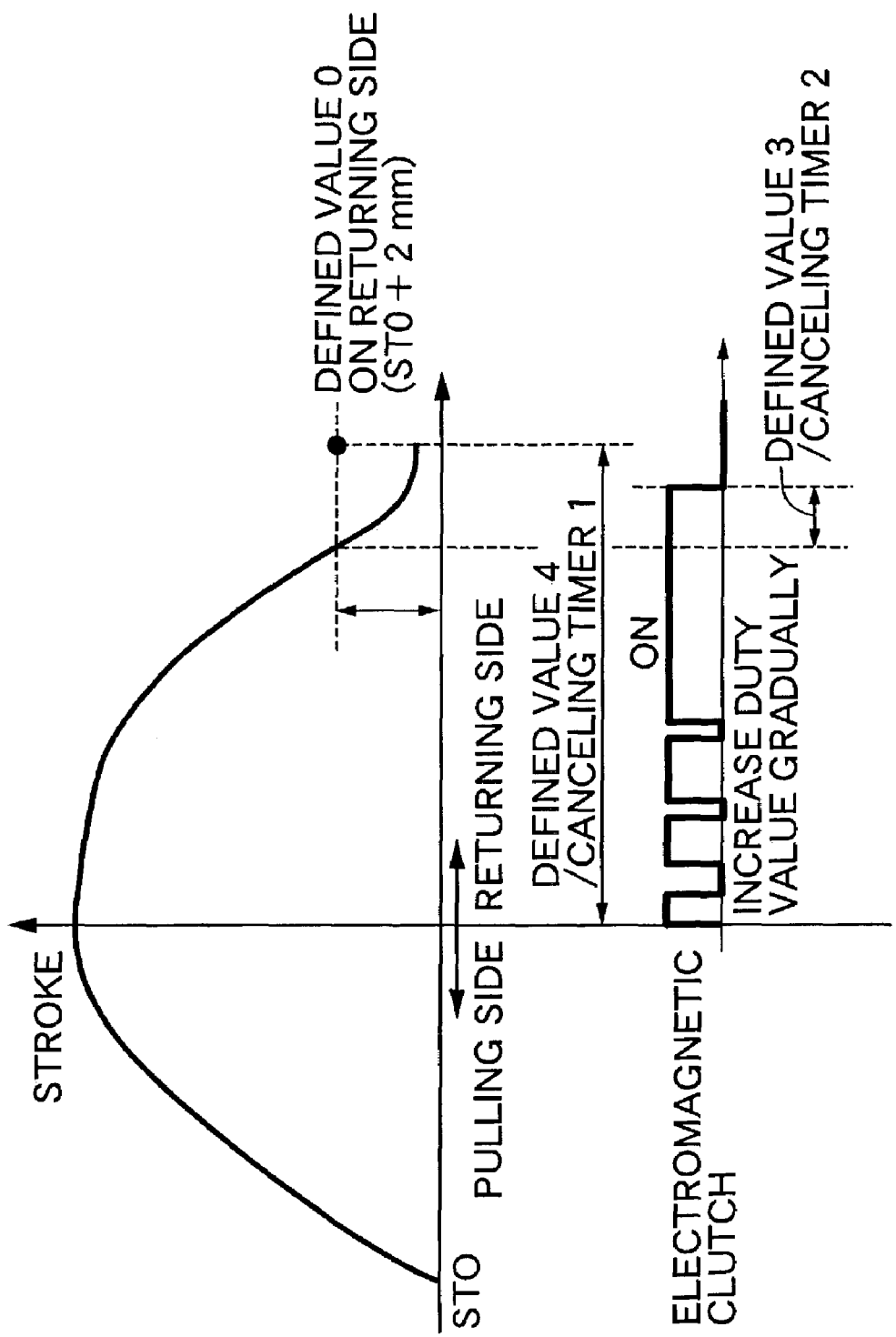
FIG. 22 is a time chart showing one example of the operation of the automatic cancellation 2.

One example of the operation of the automatic cancellation 2 of the electrically-operated parking brake device 12 is shown in a time chart shown in FIG. 22.

After the electrically-operated parking brake device 12 is actuated, electric current is supplied to the electromagnetic clutch 33 to be cancelled, and the duty Cd thereof is increased gradually from 50%. At this time, the supplying of electric current to the electric motor 30 is not carried out, and the electrically-operated parking brake device 12 is cancelled by resilient forces of return springs of the wheel brakes 11, 11. When the stroke of the electrically-operated parking brake device 12 reaches the defined value 0 (the position 2 mm in front of the zero position ST0), the canceling timer 2 is started. When the canceling timer 2 reaches the defined value 3 (e.g., 0.2 sec), the supplying of the electric current to the electromagnetic clutch 33 is stopped. Although the canceling timer 1 becomes equal to or larger than the defined value 4 (e.g., 2 sec) if the stroke does not reach the defined value 0 (the position 2 mm in front of the zero position ST0), the automatic cancellation 1 is carried out to forcibly cancel the electrically-operated parking brake device 12 by the reverse rotation of the electric motor 30.

The operation of the embodiment of the present invention described with reference to each of the above-described flow charts is summarized in Table 3 to Table 5.

TABLE 3

On Flat Road ($-\theta \leq$ inclination $\leq \theta$)

Automatic motion (only automatic mode)

| Automatic operation | Automatic cancellation *Automatic cancellation is carried out only when motion F > 0 (after operation) |
|---|---|
| P Not automatically operated at an inclination equal to or smaller than 10% | Not automatically canceled |
| R Brake pedal ON; accelerator opening degree OFF; and stoppage of vehicle has been established + Any of the following cases: | Brake pedal ON; accelerator opening degree OFF; and stoppage of vehicle has been established + |
| (1) There is a stoppage-retention demand from the outer ECU; and (2) Amount of increase in liquid pressure $\geq$ defined amount | Immediately after change to R range Any of the following cases: (1) Brake pedal OFF; and (2) Accelerator pedal ON |
| N Brake pedal ON; accelerator opening degree OFF; and stoppage of vehicle has been established + Any of the following cases: | Not automatically canceled |
| (1) There is a stoppage-retention demand from the outer ECU; and (2) Amount of increase in liquid pressure $\geq$ defined amount | |
| D Brake pedal ON; accelerator opening degree OFF; and stoppage of vehicle has been established + Any of the following cases: | Brake pedal ON; accelerator opening degree OFF; and stoppage of vehicle has been established + |
| (1) There is a stoppage-retention demand from the outer ECU; and (2) Amount of increase in liquid pressure $\geq$ defined amount | Immediately after change to D range Any of the following cases: (1) Brake pedal OFF; and (2) Accelerator pedal ON |

First, the operation of the electrically-operated parking brake device 12 when the vehicle is on a flat road surface will be described based on Table 3. Herein, the road surface is assumed to be as flat as the vehicle is not slipped down an upward slope against a creeping force in a forward moving direction in the D range and is not slipped down a downward slope against a creeping force in a backward moving direction in the R range.

The left side columns in Table 3 explains cases where the electrically-operated parking brake device 12 is automatically operated. When the shift position is in the P range, the automatic operation is not carried out. This is because when the electrically-operated parking brake device 12 is operated in the P range, there is a fear that an adverse effect is exerted to the durability because the period of time in which the shift position is in the P range is generally longer than that in the other ranges. In the P range, a parking lock for a transmission is operated and hence, if an inclination of a road surface is particularly not intense, there is no problem even if the electrically-operated parking brake device 12 is not actuated.

However, when the brake pedal is in a turned-on state; the accelerator opening degree is OFF; and the stoppage of the vehicle has been established (a predetermined time has been elapsed at a vehicle speed equal to 0), if the absolute value of the inclination of a road surface exceeds 10%, then it is considered that only the operation of the parking lock of the transmission is insufficient to maintain the stoppage of the vehicle and hence, exceptionally, the electrically-operated parking brake device 12 is automatically operated (see Steps S112 and S113 of the flow chart shown in FIG. 11).

In the R range, the N range and the D range, the electrically-operated parking brake device 12 is automatically operated upon the establishment of at least one of a condition (1) that there is a stoppage-retention demand from the outer ECU and a condition (2) that an amount of increase in liquid pressure by the depression of the brake pedal≧a defined amount, in addition to the condition that the brake pedal is in the turned-on state, the condition that the accelerator opening degree is OFF; and the condition that the stoppage of the vehicle has been established (the predetermined time has been elapsed at the vehicle speed equal to 0).

The right side columns in Table 3 explains cases where the electrically-operated parking brake device 12 is automatically canceled. This automatic cancellation is carried out only when the motion flag is equal to "1" (after the electrically-operated parking brake device 12 is operated).

In the P range and N range, the automatic cancellation is not carried out. The reason is as follows: To begin with, the P range and N range are not ranges for traveling of the vehicle and hence, unless the driver automatically cancels the actuating/canceling switch 29b to the canceling side, the automatic cancellation is not required.

In the R range, the automatic cancellation is carried out immediately after shifting from the other range to the R range, under the condition that the brake pedal is in the turned-on state, the condition that the accelerator opening degree is OFF; and the condition that the stoppage of the vehicle has been established (the predetermined time has been elapsed at the vehicle speed equal to 0). This is because the driver has expressed his intention to move the vehicle backwards by the shifting to the R range. Also when at least one of the turning-off of the brake pedal and the turning-off of the accelerator pedal is carried out, the automatic cancellation is carried out on the decision that the driver has expressed his intention to move the vehicle backwards.

In the D range, the automatic cancellation is carried out immediately after shifting from the other range to the D range, under the condition that the brake pedal is in the turned-on state, the condition that the accelerator opening degree is OFF; and the condition that the stoppage of the vehicle has been established (the predetermined time has been elapsed at the vehicle speed equal to 0). This is because the driver has expressed his intention to move the vehicle forwards by the shifting to the D range. Also when at least one of the turning-off of the brake pedal and the turning-on of the accelerator pedal is carried out, the automatic cancellation is carried out on the decision that the driver has expressed his intention to move the vehicle forwards.

TABLE 4

On Upward Slope (inclination > θ)

Automatic motion (only automatic mode)

| Automatic operation | Automatic cancellation *Automatic cancellation is carried out only when motion F > 0 (after operation) |
|---|---|
| P  Not automatically operated at an inclination equal to or smaller than 10% | Not automatically canceled |
| R  Brake pedal ON; accelerator opening degree OFF; and stoppage of vehicle has been established + Any of the following cases: | Brake pedal ON; accelerator opening degree OFF; and stoppage of vehicle has been establish + |
| (1) There is a stoppage-retention demand from the outer ECU; and (2) Amount of increase in liquid pressure ≧ defined amount | Immediately after change to R range Any of the following cases: (1) Brake pedal OFF; and (2) Accelerator pedal ON |
| N  Brake pedal ON; accelerator opening degree OFF; and stoppage of vehicle has been established + Any of the following cases: (1) There is a stoppage-retention demand from the outer ECU; and (2) Amount of increase in liquid pressure ≧ defined amount | Not automatically canceled |
| D  Brake pedal ON; accelerator opening degree OFF; and stoppage of vehicle has been established | Accelerator pedal ON + throttle opening degree > defined value |

The description will be given based on Table 4 about the operation of the electrically-operated parking brake device 12 when the vehicle is on an upward slope, the inclination of the road surface of which exceeds a defined value (an angle at which a component of the weight of the vehicle in a direction toward the slope is balanced with a creeping force; see FIG. 19), namely, when the vehicle is about to be slipped down the upward slope (when the answer is YES at Step S137 of the flow chart shown in FIG. 13). Here, differences from the operation on the flat road described about Table 3 will be described in detail.

The automatic operation in the P range is carried out upon the establishment of all the conditions that the brake pedal has been turned on, that the accelerator opening degree is OFF and that the stoppage of the vehicle has been established (the predetermined time has been elapsed at the vehicle speed equal to 0). The reason why the automatic operation is not carried out only under the condition that the shifting to the P range has been carried out, is that a possibility of break-down of the shift position sensor is considered.

The automatic operation in the R range and the N range is the same as in the case of the flat road in Table 3. Unlike the P range, the N range requires at least one of the following conditions is established: (1) the condition that there is the stoppage-retention demand from the outer ECU and (2) the condition that the amount of increase in liquid pressure by the depression of the brake pedal≧the defined amount. The reason why is that he driver does not always intend to park or stop when shifting the shift position to the N range, unlike the P range.

The automatic operation in the D range is carried out when all the following conditions are established: the condition that the brake pedal is in the turned-on state, the condition that the accelerator opening degree is OFF and the condition that the stoppage of the vehicle has been established (the predetermined time has been elapsed at the vehicle speed equal to 0). Here, it is not a requirement that at least one of the following conditions is established: (1) the condition that there is the stoppage-retention demand from the outer ECU and (2) the condition that the amount of increase in liquid pressure by the depression of the brake pedal≧the defined amount. The reason why is that there is a possibility that the vehicle is slipped down the upward slope against the driver's intention due to the inclination of the road surface.

The conditions for the automatic cancellation in the P range, the R range and the N range are the same as in the case of the flat road in Table 3, but the conditions for the automatic cancellation in the D range are different from those in the flat road in Table 3. More specifically, in the case of the upward slope, the automatic cancellation is carried out, if the accelerator pedal is in the turned-on state and the throttle opening degree exceeds the defined value (the throttle opening degree at which the moving force provided in the forward direction by the engine is balanced with the moving force provided in the backward direction by the force of gravity) (see Steps S138 and S139 of the flow chart shown in FIG. 13). Therefore, when the driver depresses the accelerator pedal in the D range trying to move the vehicle up the upward slope, whereby the vehicle is about to start, the electrically-operated parking brake device 12 is canceled at that moment, and hence, the smooth starting of the vehicle can be achieved, while alleviating the driver's burden.

TABLE 5

On Downward Slope (inclination ≦ −θ)

Automatic motion (only automatic mode)

| Automatic operation | Automatic cancellation *Automatic cancellation is carried out only when motion F > 0 (after operation) |
|---|---|
| P Not automatically operated at an inclination equal to or smaller than 10% | Not automatically canceled |
| R Brake pedal ON; Accelerator opening degree OFF; and Stoppage of vehicle has been established | Accelerator pedal ON + throttle opening degree > defined value |
| N Brake pedal ON; accelerator opening degree OFF; and stoppage of vehicle has been established + Any of the following cases: (1) There is a stoppage-retention demand from the outer ECU; and (2) Amount of increase in liquid pressure ≧ defined amount | Not automatically canceled |
| D Brake pedal ON; accelerator opening degree OFF; and stoppage of vehicle has been established + Any of the following cases: (1) There is a stoppage-retention demand from the outer ECU; and (2) Amount of increase in liquid pressure ≧ defined amount | Brake pedal ON; accelerator opening degree OFF; and stoppage of vehicle has been established + Immediately after change to D range Any of the following cases: (1) Brake pedal OFF; and (2) Accelerator pedal ON |

The description will be given based on Table 5 about the operation of the electrically-operated parking brake device 12 when the vehicle is on a downward slope, if the inclination of the road surface of which exceeds a defined value (an angle at which a component of the weight of the vehicle in a direction toward the slope is balanced with a creeping force; see FIG. 20), namely, when the vehicle is about to be slipped down the downward slope (when the answer is YES at Step S145 of the flow chart shown in FIG. 13). Here, differences from the operation on the flat road described about Table 3 will be described in detail.

The automatic operation in the P range is carried out upon the establishment of all the conditions that the brake pedal has been turned on, that the accelerator opening degree is OFF and that the stoppage of the vehicle has been established (the predetermined time has been elapsed at the vehicle speed equal to 0). The reason why the automatic operation is not carried out only under the condition that the shifting to the P range has been carried out, is that a possibility of break-down of the shift position sensor is considered.

The automatic operation in the D range and the N range is the same as in the case of the flat road in Table 3. Unlike the P range, the N range requires at least one of the following conditions is established: (1) the condition that there is the stoppage-retention demand from the outer ECU and (2) the condition That the amount of increase in liquid pressure by the depression of the brake pedal≧the defined amount. The reason why is that the driver does not always intend to park or stop when shifting the shift position to the N range, unlike the P range.

The automatic operation in the R range is carried out when all the following conditions are established: the condition that the brake pedal is in the turned-on state, the condition that the accelerator opening degree is OFF and the condition that the stoppage of the vehicle has been established (the predetermined time has been elapsed at the vehicle speed equal to 0). Here, it is not a requirement that at least one of the following conditions is established: (1) the condition that there is the stoppage-retention demand from the outer ECU and (2) the condition that the amount of increase in liquid pressure by the depression of the brake pedal≧the defined amount. The reason why is that there is a possibility that the vehicle is slipped down the downward slope against the driver's intention due to the inclination of the road surface.

The conditions for the automatic cancellation in the P range, the D range and the N range are the same as in the case of the flat road in Table 3, but the conditions for the automatic cancellation in the R range are different from those in the flat road in Table 3. More specifically, in the case of the downward slope, the automatic cancellation is carried out, if the accelerator pedal is in the turned-on state and the throttle opening degree exceeds the defined value (the throttle opening degree at which the moving force provided in the backward direction by the engine is balanced with the moving force provided in the forward direction by the force of gravity) (see Steps S146 and S139 of the flow chart shown in FIG. 13). Therefore, when the driver depresses the accelerator pedal in the R range trying to move the vehicle up the downward slope, whereby the vehicle is about to start, the electrically-operated parking brake device 12 is canceled at that moment, and hence, the smooth starting of the vehicle can be achieved, while alleviating the driver's burden.

The operation and the cancellation of the electrically-operated parking brake device 12 by the actuating/canceling switch 29b are always possible irrespective of the shift position. In addition, the operation and the cancellation of the electrically-operated parking brake device 12 by the actuating/canceling switch 29b can be carried out not only when the manual mode has been selected by the mode changeover switch 29a but also when the automatic mode has been selected.

As described above, the electrically-operated parking brake device 12 is automatically actuated only when the vehicle is slipped rearwards on an upward slope against the creeping force in the forward direction and when the vehicle is slipped forwards on a downward-slope against the creeping force in the backward direction; not when the driver depresses the brake pedal and releases the accelerator pedal to stop the vehicle or when there is a command from the outside ECU32 nor when the brake pedal has been further depressed. Thus, only when there is a possibility that the vehicle is moved in a direction opposite from a direction in which the driver intends to move the vehicle, the electrically-operated parking brake device 12 is actuated. Therefore, it is possible to decrease the frequency of the actuation of the electrically-operated parking brake device 12 to prevent a reduction in durability thereof, while preventing the slipping-down of the vehicle in an unintended direction to eliminate a driver's sense of discomfort.

Except when there is the command from the outer ECU32 and when the brake pedal has been further depressed, the electrically-operated parking brake device 12 is not automatically actuated on a flat road, a downward slope in the D range and an upward slope in the R range. Therefore, it is possible to enable the smooth starting of the vehicle by a creeping force or the force of gravity, while loosening the depression of the brake pedal, thereby alleviating the driver's burden during garaging of the vehicle or during a traffic snarl. Moreover, it is possible to previously prevent the abrupt starting of the vehicle caused on the downward slope in the D range and the upward slope in the R range by the cancellation of the electrically-operated parking brake device 12 in a state in which the force of gravity has been added to a power from the engine.

In addition, when the driver has depressed the brake pedal and releases the accelerator pedal to stop the vehicle, if the driver further depresses the brake pedal, the electrically-operated parking brake device 12 is actuated automatically. Therefore, it is possible to alleviate the driver's operating burden, as compared with a case where the electrically-operated parking brake device 12 is actuated by operating the switch or the lever. Moreover, the further or increased depression on the brake pedal can be conducted without shifting the driver's sight line, leading to an advantage in terms of safety.

When the shifting is carried out from a range other than the D range to the D range unless the vehicle is on a steep upward slope leading to a possibility that the vehicle is slipped backwards, or when the shifting is carried out from a range other than the R range to the R range unless the vehicle is on a steep downward slope leading to a possibility that the vehicle is slipped forwards, the electrically-operated parking brake device 12 is canceled automatically without waiting for the depression of-the accelerator pedal with the driver's intention taken into consideration. Therefore, the driver is not required to manually cancel the electrically-operated parking brake device 12, thereby alleviating the driver's operating burden, and also preventing the abrupt starting of the vehicle due to the cancellation of the electrically-operated parking brake device 12 in a state in which the accelerator pedal has been depressed to transmit a large driving force to the driven wheels. Especially, the electrically-operated parking brake device 12 is canceled automatically not only upon the shifting from the P range or the N range to the D range or the R range, but also upon the shifting from the D range to the R range or from the R range to the D range, to thereby further remarkably exert the above-described effect.

When the shifting to the D range is carried out during operation of the electrically-operated parking brake device 12 on the downward slope, or when the shifting to the R range is carried out during operation of the electrically-operated parking brake device 12 on the upward slope, if the inclination of the downward slope or the upward slope is gentle, the electric current is supplied to the electromagnetic clutch 33 to cancel the braking and is supplied in the returning direction to the electric motor 30 to cancel the electrically-operated parking brake device 12. Therefore, it is possible to promptly cancel the electrically-operated parking brake device 12 to enable the smooth starting of the vehicle free from a hitching feeling.

On the other hand, if the inclination of the downward slope or the upward slope is steep, the electric current is supplied to only the electromagnetic clutch 33 to cancel the braking and is not supplied in the returning direction to the electric motor 30 and hence, the electrically-operated,parking brake device 12 is canceled slowly by only the resilient forces of the return springs of the wheel brakes 11, 11. Thus, it is possible to previously prevent the vehicle from abruptly starting by a resultant force provided from a combination of the force of gravity in a direction toward the slope and the creeping force. Especially, the speed of cancellation of the electrically-operated parking brake device 12 can be regulated as desired by supplying the electric current to the electromagnetic clutch 33 with a predetermined duty to cancel the braking.

Although the embodiments of the present invention have been described in detail, it will be understood that various modifications in design may be made without departing from the spirit and scope of the invention defined in the claims.

For example, the power generating source for the vehicle using the electrically-operated parking brake device according to the present invention, is not limited to a gasoline engine or a diesel engine, and may be an electric motor as well as a combination of an engine and an electric motor.

What is claimed is:

1. An electrically-operated parking brake device adapted to actuate wheel brakes by an electrically driving mechanism, wherein when one of a forward traveling range and a backward traveling range is selected and the wheel brakes are in operation, if the one traveling range is shifted to the other traveling range, the wheel brakes are released in response to said shifting;

the electrically driving mechanism comprising
   a brake actuator;
   a sensor input which receives information from vehicle sensors; and
   a controller which controls the brake actuator based on information received from the vehicle sensors;
the controller calculates a targeted brake force based on information received from the sensor input and controls the brake actuator in a manner consistent with the calculated targeted brake force;
the vehicle sensors include an inclination sensor which detects the inclination of the road surface; and
wherein the calculated targeted brake force comprises
   a first target force that is used when the electrically operated parking brake device is functioning normally and is determined by the amount of inclination of the road surface as sensed by the inclination sensor;
   a second target force that is used when a service brake is in a defective state; and
   a third target force that is used when the inclination sensor has failed.

2. The electrically-operated parking brake device of claim 1 wherein the wheel brakes comprise parking brakes.

3. The electrically-operated parking brake device of claim 1 wherein the forward traveling range comprises at least Drive gear, and wherein the backward traveling range comprises Reverse gear.

4. The electrically-operated parking brake device of claim 1 wherein when one of a forward traveling range and a backward traveling range is selected and the wheel brakes are in operation, if the one traveling range is shifted to the other traveling range, the wheel brakes are released in response to said shifting independent of a position of a throttle of a vehicle on which the electrically-operated parking brake device is disposed.

5. An electrically-operated parking brake device adapted to actuate wheel brakes of a vehicle, the electrically-operated parking brake device comprising an electrically driving mechanism and parking brakes, the electrically driving mechanism connected to the parking brakes using brake cables, wherein
the electrically driving mechanism comprises
a brake actuator which applies a braking force to the brake cables,
a sensor input which receives information from vehicle sensors, and
a controller which controls the brake actuator based on information received from the vehicle sensors, the controller calculates a targeted brake force based on information received from the vehicle sensors and controls the brake actuator in a manner consistent with the calculated targeted brake force, and
vehicle sensors comprise an inclination sensor which detects inclination of the road surface, and wherein the calculated targeted brake force comprises
a first target force that is used when the electrically operated parking brake device is functioning normally and is determined by the amount of inclination of the road surface as sensed by the inclination sensor;
a second target force that is used when a service brake is in a defective state; and
a third target force that is used when the inclination sensor has failed.

6. The electrically-operated parking brake device of claim 5 wherein operation of the electrically-operated parking brake device is automatically cancelled when the vehicle gears are shifted between a first traveling gear range and a second traveling gear range.

7. The electrically-operated parking brake device of claim 5 wherein when one of a forward traveling gear range and a backward traveling gear range is selected and the wheel brakes are in operation, if the one traveling gear range is shifted to the other traveling gear range, the operation of the electrically-operated parking brake device is automatically cancelled in response to the shifting of the gears.

8. The electrically-operated parking brake device of claim 5 further comprises means for manual operation of the parking brakes, and
the manual operation means allowing manual cancellation of the operation of the electrically-operated parking brake device when at least one of the controller and the wheel brakes is not functioning.

9. The electrically-operated parking brake device of claim 8, further comprising a switch which may be selectively actuated to switch between an automatic mode where the controller controls operation of the electrically-operated parking brake device, and a manual mode wherein the manual operation means controls the operation of the electrically-operated parking brake device.

10. The electrically-operated parking brake device of claim 9 wherein when the vehicle is in automatic mode, and the vehicle is in a Park (P) gear shift position, the electrically-operated parking brake device is not automatically operated.

11. The electrically operated parking brake device of claim 5 wherein the electrically-operated parking brake device automatically operates in tandem with the brakes activated by a brake pedal of the vehicle so as to minimize effort required to activate the brakes using the brake pedal.

* * * * *